(12) United States Patent
Chen et al.

(10) Patent No.: US 11,415,863 B2
(45) Date of Patent: Aug. 16, 2022

(54) VARIABLE APERTURE DEVICE, CAMERA MODULE AND APPLICATION THEREOF

(71) Applicant: Ningbo Sunny Opotech Co., Ltd., Zhejiang (CN)

(72) Inventors: Zhenyu Chen, Zhejiang (CN); Yinli Fang, Zhejiang (CN); Hailing Ding, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 0 days.

(21) Appl. No.: 17/264,904

(22) PCT Filed: Aug. 3, 2018

(86) PCT No.: PCT/CN2018/098399
§ 371 (c)(1),
(2) Date: Feb. 1, 2021

(87) PCT Pub. No.: WO2020/024237
PCT Pub. Date: Feb. 6, 2020

(65) Prior Publication Data
US 2021/0302803 A1    Sep. 30, 2021

(51) Int. Cl.
*G03B 7/095* (2021.01)
*B29D 11/00* (2006.01)
*G02B 7/20* (2021.01)

(52) U.S. Cl.
CPC .......... *G03B 7/095* (2013.01); *B29D 11/0074* (2013.01); *G02B 7/20* (2013.01); *B29D 11/00865* (2013.01)

(58) Field of Classification Search
CPC ...... G03B 27/20; G03B 7/095; G02B 26/004; G02B 7/20; B29D 11/00; B29D 11/00634;
(Continued)

(56) References Cited

U.S. PATENT DOCUMENTS 7,359,124 B1    4/2008    Fang et al.
10,027,899 B2   7/2018    He et al.
(Continued)

FOREIGN PATENT DOCUMENTS

CN   104243782    12/2014
WO   2015/022027   2/2015

OTHER PUBLICATIONS

Extended European Search Report issued Jul. 6, 2021 in corresponding European Patent Application No. 18928246.0.
(Continued)

*Primary Examiner* — Christopher E Mahoney
(74) *Attorney, Agent, or Firm* — Wenderoth, Lind & Ponack, L.L.P.

(57) ABSTRACT

A variable aperture device, which is suitable for photographing and filming of a camera module, includes a main body, a fluid passage, and a fluid accommodation cavity, wherein the main body is used to be provided in the camera module, and the main body has a light-transmitting region, the fluid passage is provided in the light-transmitting region of the main body, the fluid accommodation cavity is in communication with the fluid passage for an light-impermeable fluid to be driven to flow back and forth between the fluid accommodation cavity and the fluid passage to enlarge or reduce the light transmission area of the light-transmitting region.

20 Claims, 19 Drawing Sheets

(58) Field of Classification Search
CPC ........ B29D 11/00865; B29D 11/00903; B29D 11/0074
See application file for complete search history.

(56) References Cited

U.S. PATENT DOCUMENTS

| | | |
|---|---|---|
| 2004/0183965 A1 | 9/2004 | Lundgren |
| 2010/0182703 A1 | 7/2010 | Bolis |
| 2013/0206323 A1* | 8/2013 | Blackburn ......... B29D 11/0074 264/1.7 |
| 2014/0191107 A1 | 7/2014 | Lee et al. |
| 2019/0155146 A1* | 5/2019 | Hribar ....................... G03F 1/66 |

OTHER PUBLICATIONS

Christina Kimmle et al., "Compact Dynamic Microfluidic Iris for Active Optics", Microelectronic Engineering, vol. 88, No. 8, Aug. 1, 2011, pp. 1772-1774.
Philipp Müller, "Optofluidic Micro-Shutters and Micro-Irises", Cambridge University Press, Cambridge, Jan. 1, 2016, pp. 156-175, XP055818406.
Yu Hongbin et al., "Optofluidic Variable Aperture", Optics Letters, vol. 33, No. 6, Mar. 15, 2008, pp. 548-550.
International Search Report dated Dec. 7, 2018 in International (PCT) Application No. PCT/CN2018/098399.

\* cited by examiner

VARIABLE APERTURE DEVICE, CAMERA MODULE AND APPLICATION THEREOF

FIELD OF THE INVENTION

The present invention relates to the field of photographing and filming, and further relates to a variable aperture device, a camera module and application thereof, and still further relates to a variable aperture device, a camera module and application thereof that realizes a smaller space occupation in a mobile device.

BACKGROUND OF THE INVENTION

With the rapid development of mobile smart devices, mobile smart devices such as mobile phones, iPads or smart watches have gradually become daily necessities carried by almost everyone at any time. Therefore, the lighter, thinner and smaller structural size has become an important indicator for people's choice to purchase and convenient daily use. In particular, with people's picky and high-end demand for the camera function of mobile phones, such as the dual camera module, pixel size or variable aperture of the camera module of mobile phones, people are more inclined to choose or use the phone which is with better camera functions and thinner and lighter to meet the requirement of convenience and clarity of daily photography and rich of functions.

In the existing camera modules, as the lens size of the camera module is fixed, a variable aperture with changeable shape, position or area is generally adopted to be set at the light inlet of the lens hole of the lens to change the shielding area of the light entering the lens hole in order to adjust the amount of light received by the camera module through the change of the variable aperture device. Accordingly, variable aperture is added to the lens inlet of the camera module to adjust the amount of light entering the camera module, thus increasing the thickness of the camera module, which leads to the increased thickness of the mobile phone. Therefore, to design a camera module with a variable aperture more rationally is to make it thinner, which makes it more popular.

Most of the current variable aperture adopt a mechanical structure made of multiple metal sheets or hole-shaped gratings, etc. Through complex mechanical movement or overlap, etc., they control the size of the area that blocks the light, so as to adjust the amount of light entering. For example, the iris diaphragm, it has a circular structure with a central circular hole composed of a plurality of overlapping arc-shaped thin metal sheets. The open or close of each metal sheet is mechanically controlled to change the size of the center circle of the circular structure, thus enabling the light to enter the lens group of the camera module only through the variable central circular hole, thereby controlling the amount of light entering. Inevitably, the mechanical structure and movement of the variable aperture will occupy a lot of space, so that the thickness and weight of the camera module will be severely increased, occupying a large amount of internal space of the mobile phone, and cannot meet the needs of people.

Therefore, in the current mobile phone market, in order to adapt to the thinner size of the mobile phone, the size of the camera module of the mobile phone must be smaller and thinner, and part of the camera function needs to be discarded, such as the aforementioned variable aperture, optical zoom, etc. Generally, in order to improve the user's photo experience, the usual method is to use the adjustment method with software APP in the mobile phone, by post adjustment of the brightness of the image through the algorithm to achieve a similar effect to the variable aperture. However, as this approach is to process the brightness and darkness of the image taken by the camera module, but not to change the aperture size of the camera module itself, it cannot control the amount of light entering the camera module, thus it cannot reflect the depth of field or background blur effects of the captured image.

In addition, before the operation, the initial position of the aperture is usually kept at the position of maximum amount of light entering or the minimum amount of light entering. During operation, it can only unidirectionally change the amount of light entering the aperture in one direction, thus increasing the time to adjust the aperture. If the initial position is at the position of maximum amount of light, when a smaller amount of light entering is required, the user needs to adjust the aperture by gradually turning it from the position of maximum amount of light to the position of a smaller amount of light entering. The adjustment time is significantly long, which decreases user experience.

SUMMARY OF THE INVENTION

An object of the present invention is to provide a variable aperture device, a camera module and application thereof, which are suitable for photographing and filming of a mobile smart device. The user can adjust size of a light-transmitting area of the variable aperture to control the amount of light entering the camera module, that is, adjust an effective light-transmitting region of the camera module, thereby having an adjustable depth of field, and making shooting effect more diverse.

Another object of the present invention is to provide a variable aperture device, a camera module and application thereof, compared with a variable aperture of a traditional mechanical structure, its size is thinner, so that a mobile smart device occupies smaller space to facilitate people to carry and use.

Another object of the present invention is to provide a variable aperture device, a camera module and application thereof, which have a light-transmitting region and a light-impermeable region, wherein the light-impermeable region is arranged around the light-transmitting region. At the time of shooting, the light-impermeable region is adjustable to reduce an area of the light-transmitting region from outside to inside, and to expand the area of the light-transmitting region from inside to outside, and thus adjusting amount of light entering, i.e. adjusting the area of the effective light-transmitting region of the camera module.

Another object of the present invention is to provide a variable aperture device, a camera module and application thereof, which adopt a spiral to adjust the size of the variable aperture uniformly from outside to inside and from inside to outside, thus making the photographic effect better.

Another object of the present invention is to provide a variable aperture device, a camera module and application thereof, which drive light-impermeable fluid into and out of the light-transmitting region, so as to reduce or enlarge the light-transmitting area of the light-transmitting region, and then adjust the amount of light entering the variable aperture.

Another object of the present invention is to provide a variable aperture device, a camera module and application thereof, wherein the light-impermeable fluid spirally gets into and out of the light-transmitting region, so that the amount of light entering is well controlled.

Another object of the present invention is to provide a variable aperture device, a camera module, and applications thereof, which include a driving unit that is directly or indirectly drive the light-impermeable fluid into and out of the light-transmitting region to adjust the amount of light entering.

Another object of the present invention is to provide a variable aperture device, a camera module and an application thereof, in which the light-impermeable region is formed by means of painting or coating.

Another object of the present invention is to provide a variable aperture device, a camera module and application thereof, which store the light-impermeable fluid.

Another object of the present invention is to provide a variable aperture device, a camera module, and applications thereof, in which a groove for the light-impermeable fluid to flow or to be accomodated is formed by using technics such as etching or molding.

Another object of the present invention is to provide a variable aperture device, a camera module and application thereof, wherein a groove shape can be implemented as an arc or a V shape or a trapezoid or other shapes.

Another object of the present invention is to provide a variable aperture device, a camera module and applications thereof, which directly or indirectly drive the flow of the light-impermeable fluid with heat, cooling, or mechanical force.

Another object of the present invention is to provide a variable aperture device, a camera module, and applications thereof, which drive the flow of the light-impermeable fluid by means of gas releasing or dissolving.

Another object of the present invention is to provide a variable aperture device, camera module and application thereof, which can be implemented as a two-fluid groove type to drive the flow of the light-impermeable fluid in two directions to increase driving efficiency and Uniformity.

Another object of the present invention is to provide a variable aperture device, a camera module and application thereof, which can be mass-produced.

Another object of the present invention is to provide a variable aperture device, a camera module and application thereof, in which the amount of light entering in the variable aperture is maintained between a position of maximum light entering and a position of minimum light entering at the time of non-working, and the amount of light entering is increased or decreased in two directions at the time of working, thereby shortening the time for adjusting the variable aperture.

Another object of the present invention is to provide a variable aperture device, a camera module and application thereof, which have a simple structure, a small volume, easy manufacture, and high practicability.

According to one aspect of the present invention, the present invention further provides a variable aperture device suitable for photographing and filming of a camera module, including:

a main body, wherein the main body has a light-transmitting region;

a fluid passage, wherein the fluid passage is provided in the light-transmitting region of the main body; and a fluid accommodation cavity, wherein the fluid accommodation cavity is in communication with the fluid passage for a light-impermeable fluid to be driven to flow back and forth between the fluid accommodation cavity and the fluid passage to expand or contract a light-transmitting area of the light-transmitting region.

In some embodiments, an outer peripheral side wall of the light-transmitting region of the main body is coated with a light-impermeable region or is coated to form a light-impermeable region.

In some embodiments, it further includes a driving unit, wherein the driving unit is configured to generate heat or absorb heat to directly or indirectly act on the light-impermeable fluid in the fluid accommodation cavity.

In some embodiments, the main body includes a base and a cover, wherein the main body forms a fluid groove and a cavity groove, wherein the cavity groove is in communication with the fluid groove, and the cover is provided on the main body and seals the fluid groove and the cavity groove to form the fluid passage and the fluid accommodation cavity.

In some embodiments, wherein the fluid groove and the cavity groove are formed by etching or molding the main body.

In some embodiments, the fluid groove is an arc-shaped groove or a V-shaped groove or a trapezoidal groove.

In some embodiments, the driving unit is configured to generate heat or absorb heat to directly or indirectly act on the light-impermeable fluid in the fluid accommodation cavity.

In some embodiments, it further includes a separator, wherein the separator is provided in the fluid accommodation cavity to divide the fluid accommodation cavity into a fluid cavity and a gas cavity, wherein the fluid cavity and the fluid passages are in communication with each other, and the fluid cavity is used to store the light-impermeable fluid, and the gas cavity is sealed to store a gas.

In some embodiments, the driving unit is configured to generate heat or absorb heat to directly or indirectly act on the gas in the gas cavity.

In some embodiments, the separator is provided in the fluid accommodation cavity of the main body, and the driving unit is configured to generate a driving force to act on the separator to push or restore the light-impermeable fluid.

In some embodiments, the separator is implemented as a separating film or a separating board.

In some embodiments, the separator is horizontally or longitudinally provided in the fluid accommodation cavity.

In some embodiments, the fluid cavity is provided above or below the gas cavity.

In some embodiments, the driving unit is a temperature control device, wherein the driving unit is provided on the main body corresponding to one side of a fluid accommodation cavity, wherein the light-impermeable fluid on this side of the fluid accommodation cavity is heated to release gas or is cooled to dissolve gas to make the light-impermeable fluid flow back and forth.

In some embodiments, the driving unit is attached and mounted to the side wall of the base or the top side of the base or the cover.

In some embodiments, the fluid passage is a single spiral channel or a double spiral channel.

In some embodiments, when not in operation, the light-impermeable fluid is maintained to be totally stored in the fluid accommodation cavity or totally stored in the fluid passage or partially stored in the fluid passage and the rest is stored in the fluid accommodation cavity.

According to another aspect of the present invention, the present invention also provides a camera module, which includes a camera module main body and at least one of the variable aperture devices, wherein the variable aperture devices are respectively mounted in the camera module main body to adjust the size of the variable aperture.

According to another aspect of the present invention, the present invention also provides a method of manufacturing a variable aperture device, which includes the following steps:

i. Etching one side of a base to form a fluid groove and a cavity groove, and painting or coating periphery of the fluid groove of the base and the side of the base to form a light-impermeable region, wherein top and bottom sides of the fluid groove of the base form a light-transmitting area;

ii. disposing a separator to separate the cavity groove into a fluid cavity and a gas cavity, wherein the fluid cavity is in communication with the fluid groove, and the gas cavity is sealed to store gas, and the fluid cavity is filled with light-impermeable fluid;

iii. Attaching and sealing a cover on the side of the base to seal the fluid groove to form a fluid passage and seal the cavity groove to form a fluid accommodation cavity; and iv. disposing a driving unit at outside of the main body for transferring heat to the gas cavity to expand the air to make the separator protrude toward the fluid cavity.

In some embodiments, the step i can be replaced by a step of filling a transparent material in a molten state in a molding die, wherein the molding die has a spiral track forming a fluid groove and a protrution forming a fluid accommodation cavity, wherein the fluid groove is in communication with the cavity groove, and the transparent material is cooled and solidified to form a base and the fluid groove and the cavity groove on one side of the base, then the periphery of the fluid groove of the base and the side of the base are painted or coated to form a light-impermeable region.

According to another aspect of the present invention, the present invention also provides a method for manufacturing a variable aperture, which includes the following steps:

X, etching or molding a side of a base to form a fluid groove and a cavity groove, wherein the fluid groove is in communication with the cavity groove, and painting or coating periphery of the fluid groove of the base and the side of the base to form a light-impermeable region, wherein top and bottom sides of the fluid groove of the base form a light-transmitting region;

Y. attaching and mounting a driving unit to a cover; and

Z. attaching and sealing the cover on the side of the base to seal the fluid groove to form a fluid passage and seal the cavity groove to form a fluid accommodation cavity, wherein the driving unit acts on the light-impermeable fluid on one side of the fluid accommodation cavity, and the light-impermeable fluid is heated to release gas or cooled to dissolve gas, so that the light-impermeable fluid flows into or out of the fluid passage from the other side of the fluid accommodation cavity.

According to another aspect of the present invention, the present invention also provides a method for manufacturing a variable aperture, which includes the following steps:

A. etching or molding a base to form a fluid groove and a cavity groove, wherein a gap is opened on a right side wall of the base adjacent to the cavity groove, and the gap is in communication with the cavity groove, wherein a left side of the cavity groove is in communication with the opening of the fluid groove;

B. mounting a separator in the gap of the base to seal the right side of the cavity groove;

C. hermetically mounting a cover to the base to seal the fluid groove and the cavity groove; and D. mounting a driving unit on the side wall of the main body, wherein the driving unit acts on the separator.

According to another aspect of the present invention, the present invention also provides a method for adjusting an effective light-transmitting area of a camera module, which includes the following steps:

a. light-impermeable fluid is pushed; and b. the light-impermeable fluid flows into a light-transmitting region to reduce a light-transmitting area of the light-transmitting region.

In some embodiments, wherein step b is replaced by step c, in which the light-impermeable fluid flows out of a light-transmitting region to expand the light-transmitting area of the light-transmitting region.

In some embodiments, wherein step a includes the steps: a1, a gas is heated and expanded to protrude a separator; and a2, the separator pushes the light-impermeable fluid to flow.

In some embodiments, wherein the step a includes the steps: a1A, gas is cooled to reset a separator; and a2A, a negative pressure is formed to cause the light-impermeable fluid to flow back.

In some embodiments, wherein the step a includes the steps: a3, the light-impermeable fluid is heated to release gas; and a4, the light-impermeable fluid is pushed to flow.

In some embodiments, wherein the step a includes the steps: a3A, the light-impermeable fluid is cooled to dissolve gas; and a4A, a negative pressure is formed to make the light-impermeable fluid to flow back.

In some embodiments, wherein step a includes the steps: a5, a separator is driven to be protruded by a mechanical force; and a6, the light-impermeable fluid is pushed to flow by the separator.

In some embodiments, wherein step a includes the steps: a5A, a separator is driven and reset by a mechanical force; and a6A, a negative pressure is formed to make the light-impermeable fluid to flow back.

In some embodiments, wherein in step b: the light-impermeable fluid flows into the light-transmitting region in a spiral shape from outside to inside.

In some embodiments, wherein in step c, the light-impermeable fluid flows out of the light-transmitting region in a spiral shape from inside to outside.

DETAILED DESCRIPTION OF THE PREFERRED EMBODIMENT

Figure 1:
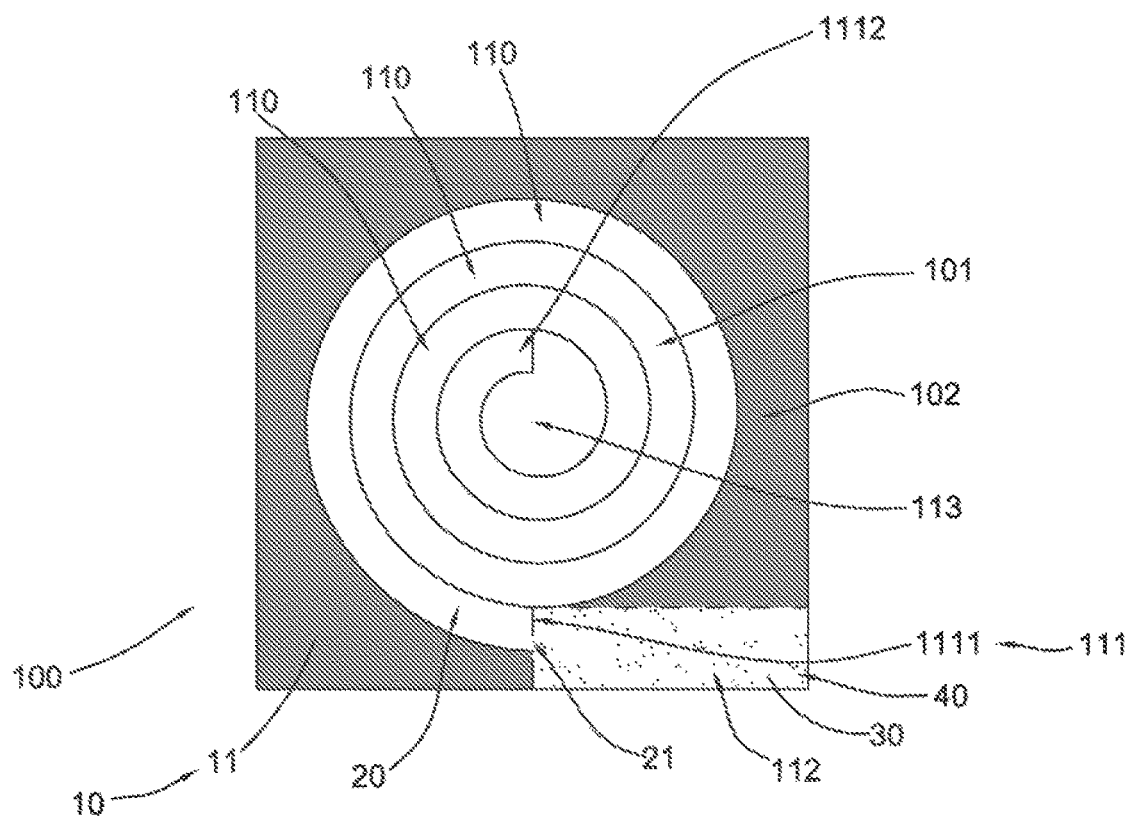
FIG. 1 is a schematic plan view of a main body of a variable aperture device according to a preferred embodiment of the present invention.

The following description is used to disclose the present invention so that those skilled in the art can implement the present invention. The preferred embodiments in the following description are only examples, and those skilled in the art can come up with other obvious variations. The basic principles of the present invention defined in the following description can be applied to other embodiments, modified embodiments, improved embodiments, equivalent embodiments, and other technical solutions that do not depart from the spirit and scope of the present invention.

Those skilled in the art should understand that, in the disclosure of the present invention, the orientation or position relationship indicated by the terms "longitudinal", "transverse", "upper", "lower", "front", "back", "left", "right", "vertical", "horizontal", "top", "bottom", "inside", "outside", etc. is based on the orientation or positional relationship shown in the drawings, which is merely for the convenience of describing the present invention and for the simplification of the description, and not to indicate or imply that the device or element referred to must have a specific orientation, or be constructed and operated in a specific orientation. Therefore, the above terms shall not be construed as a limitation of the present invention.

It can be understood that the term "a" is understood to mean "at least one" or "one or more", that is, in one embodiment, the number of an element can be one, and in another embodiment, the number of elements can be plural, and the term "a" cannot be construed as limiting the quantity.

The present invention provides a variable aperture device, a camera module, and applications thereof, which are suitable for photographing and filming of a mobile smart device, such as a mobile phone, a video camera, a tablet computer, or a smart watch. At the time of photographing and filming, the user can adjust size of a light-transmitting area of the variable aperture to control amount of light entering the camera module of the mobile smart device, thereby having an adjustable depth of field, and making shooting effect more diverse.

Normally, the variable aperture device is set in a light-in region (or light-passing region) of the camera module of the mobile smart device for adjusting the size of the light-in region for light entering and thus controlling the amount of light entering the camera module. That is, the size of an effective light-transmitting area of the light-passing region in the camera module is adjusted. In other words, the size of the variable aperture device exactly matches the size of the light-in region of the camera module, so that external light entering the light-in region can be received by the camera module only when it passes through the variable aperture device. During photographing and filming, the external light entering the light-in region must pass through the light-transmitting region of the variable aperture device before it entering the camera module, wherein the variable aperture device adopts a light-impermeable fluid that can be driven to flow back and forth by the user to block or restore the light-transmitting region of the variable aperture device, thereby changing the size of the light-transmitting area of the light-transmitting region and then controlling the amount of light entering the camera module. Compared with a variable aperture of a traditional mechanical structure, it adopts fluid flow to adjust the amount of light, making the overall size thinner, so that the mobile smart device occupies a smaller space and is convenient for people to carry and use.

In particular, for some equipments that emit light outwards, such as laser equipment, hospital optical equipment, chemical light equipment or physics equipment etc., the light generated inside the light-emitting equipment is output through the light-passing region (light-output region), wherein the variable aperture device may also be provided in the light-passing region of the light-emitting device to control the light-passing area of the light-passing region, so that the output amount of the light emitted by the light-emitting device is controlled and adjusted when passing through the variable aperture to meet the emission demand. In the present invention, the variable aperture device takes the adjustment of the amount of light entering the camera module of the mobile smart device as an example.

In the present invention, the external light can be natural light when the user is free to take pictures outdoors or indoors, and the external light can also be a specific light emitted by a special device such as infrared light, filtered light (polarized light) or laser light. That is to say, the camera module can be used to take natural light photos or special light photos to be applied to different fields of imaging such as medical photography, cinematography, scene capturing, etc. Correspondingly, the material of the variable aperture device, such as light-shielding (light-impermeable) or light-transmitting material, can also be set as a material that does not damage (do not wear) the external light, so that the external light can stably pass through the light-transmitting region of the variable aperture device, while cannot pass through the light-impermeable region of the variable aperture device or the light-impermeable fluid.

As shown in FIGS. 1-24, a variable aperture device 100 of the preferred embodiments of the present invention includes a main body 10, a fluid passage 20, a light-impermeable fluid 30, a fluid accommodation cavity 40 and a driving unit 50, wherein the main body 10 is applied to a camera module main body 210 of a camera module 200, so that light entering or exiting the camera module main body 210 needs to pass through or enter the main body 10 of the variable aperture device 100. That is, the light will not leak from a side of the main body 10, which prevents an influence to the light collection of the camera module 200. The fluid passage 20 is provided in the main body 10, the fluid accommodation cavity 40 is in communication with the fluid passage 20, and the driving unit 50 is operated by the user to act on the fluid accommodation cavity 40 to drive the light-impermeable fluid 30 to flow back and forth in the fluid passage 20 and the fluid accommodation cavity 40.

When the light-impermeable fluid 30 is driven to gradually flow into the fluid passage 20, part of the light that hits the light-impermeable fluid 30 cannot pass through the light-impermeable fluid 30, that is, part of the light cannot pass through the main body 10, while other parts of the light can still pass through the main body 10, thereby reducing a light-transmitting area of the main body 10, and thereby reducing the amount of light entering (or the amount of light passing through, the amount of light emitting, etc.). When the light-impermeable fluid 30 is driven to flow back to the fluid accommodation cavity 40, the light-transmitting area of the main body 10 is enlarged, thereby increasing the amount of light entering, so that the variable aperture device 100 can be controlled to change the amount of light entering, that is to adjust an effective light-transmitting area of the light-passing region of the camera module.

It should be noted that the light-impermeable fluid 30 is a liquid that can flow and cannot transmit light (such as a black, brown liquid, etc.), or a liquid added with black materials or light-impermeable materials such as pigment, plastic particles, or other fluid that cannot transmit light, the light-impermeable fluid 30 has low adhesion, or is added with a viscosity-removing medium to prevent the light-impermeable fluid 30 from adhering to inner walls of the fluid passage 20 at the time of flowing in the fluid passage 20, thereby ensuring a good light transmission effect of a light-transmitting region 101.

Figure 3:
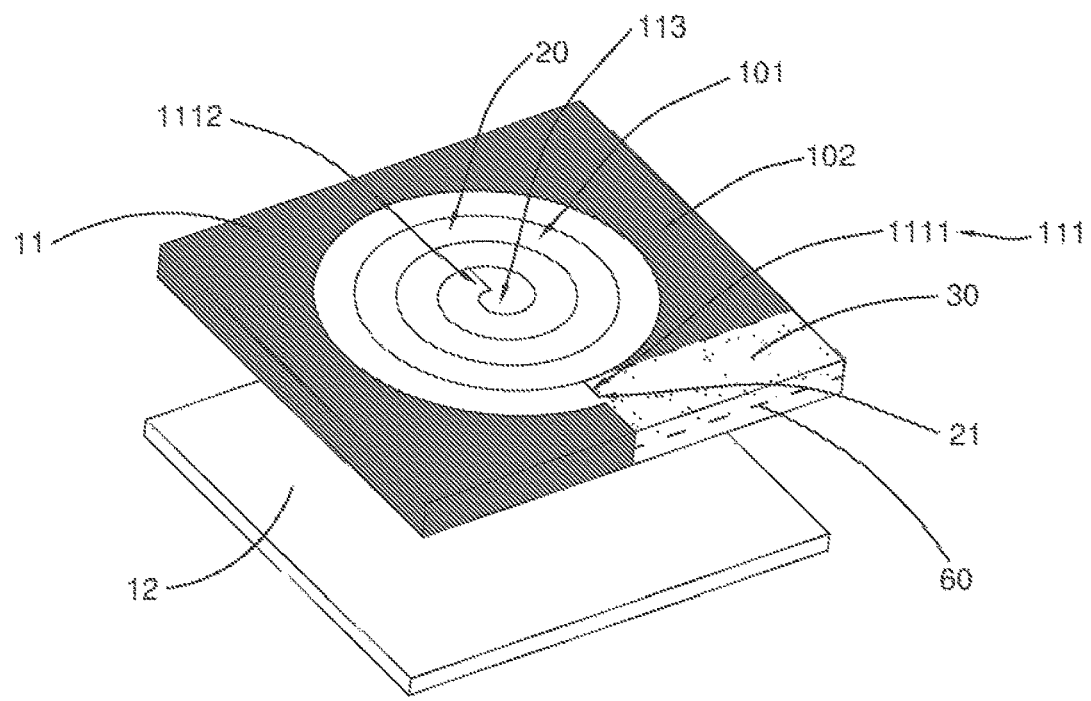
FIG. 3 is a perspective view of a base and a cover of the main body of the variable aperture device according to a preferred embodiment of the present invention.
Figure 4:
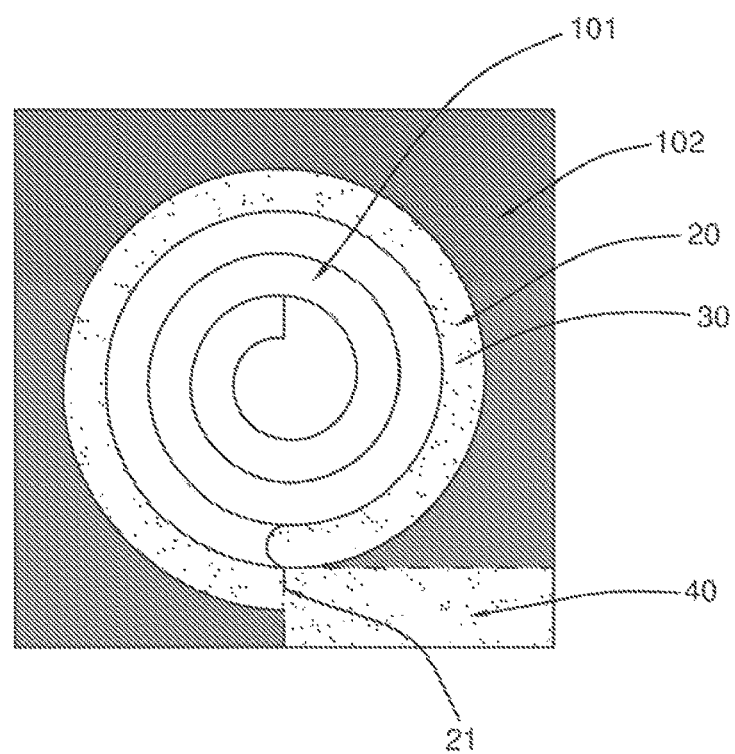
FIG. 4 is a schematic plan view showing that light-impermeable fluid enters a fluid passage of the variable aperture device according to a preferred embodiment of the present invention.

As shown in FIGS. 1 and 3, in this embodiment, the main body 10 has the light-transmitting region 101 and an light-impermeable region 102, wherein the light-transmitting region 101 is preferably provided in the middle of the main body 10, such that the light entering the camera module main body 210 passes through the light-transmitting region 101 from the middle of the main body 10, wherein the light-impermeable region 102 is provided on the periphery of the light-transmitting region 101 to prevent stray light from passing through the light impermeable area 102, thus eliminating the stray light from other directions (the light in the non-light-in region) from entering the light-transmitting region 101, thereby ensuring the controllability of the light input of the camera module main body 210.

Wherein, the fluid passage 20 is provided in the light-transmitting region 101, when the light-impermeable fluid 30 is driven by the driving unit 50 to flow into the fluid passage 20 from the fluid accommodation cavity 40, an area of the light-transmitting region 101 occupied by the light-impermeable fluid 30 cannot transmit light, that is, transmitting area of the light-transmitting region 101 is reduced. When the light-impermeable fluid 30 is driven to gradually enter the fluid passage 20, that is, when a pipe length of the fluid passage 20 that the light-impermeable fluid 30 occupies gradually increases, the area of the light-transmitting region 101 occupied by the light-impermeable fluid 30 is also gradually increased, making the light-transmitting area of the light-transmitting region 101 gradually decreases, and the amount of light passing through the main body 10 is gradually reduced, and the amount of light entering the camera module 200 can be controllably reduced by the user, realizing the gradual reduction of the amount of light entering the variable aperture. Therefore, the variable aperture device 100 can adjust the aperture size according to the needs of the photographer, so that the camera module 200 has an adjustable depth of field and more diverse shooting effects.

When the driving unit 50 drives the light-impermeable fluid 30 from the fluid passage 20 to gradually flow into the fluid accommodation cavity 40, the light-impermeable fluid 30 in the fluid passage 20 gradually decreases, that is, the pipe length of the fluid passage 20 occupied by the light-impermeable fluid gradually decreases, and the area of the light-transmitting region 101 occupied by the light-impermeable fluid 30 gradually decreases, so that the light-transmitting area of the light-transmitting region 101 gradually increases, thereby gradually increasing the amount of light passing through the main body 10, and the amount of light entering the camera module 200 can controllably be increased gradually, realizing a gradual increase in the amount of light entering the variable aperture, that is, adjusting the size of the effective area of the light-passing region in the camera module.

The method for adjusting the area of the effective light-transmitting area of the camera module includes the following steps:

a. the light-impermeable fluid 30 is pushed; and b. the light-impermeable fluid 30 flows into the light-transmitting region 101 to reduce the light-transmitting area of the light-transmitting region 101.

Wherein, step b can be replaced with step c. The light-impermeable fluid 30 flows out of the light-transmitting region 101 to expand the light-transmitting area of the light-transmitting region 101.

Figure 2:
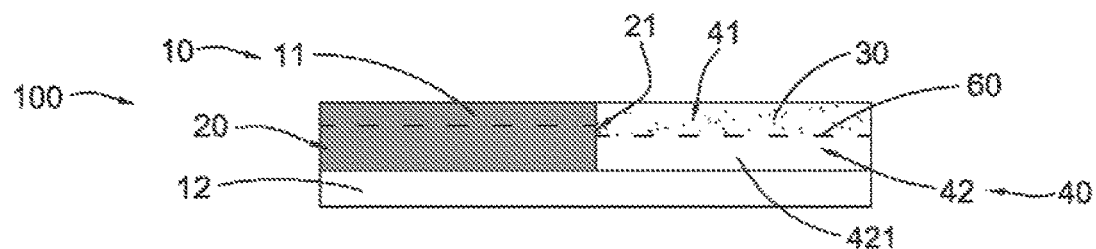
FIG. 2 is a schematic cross-sectional view of the main body of the variable aperture device according to a preferred embodiment of the present invention.

As shown in FIGS. 2 and 3, in this embodiment, the main body 10 includes a base 11 and a cover 12, wherein the cover 12 is hermetically provided on one of the sides of the base 11 (for example, a bottom side), wherein the bottom side of the base 11 has a fluid groove 111 (that is, the fluid groove 111 is a spiral channel or a spiral-like channel) and a cavity groove 112, wherein the cavity groove 112 is provided in a groove opening 1111 of the fluid groove 111 and in communication with the fluid groove 111. That is, the fluid groove 111 is sealed by the cover 12 to form the fluid passage 20, and the cavity groove 112 is sealed by the cover 12 to form the fluid accommodation cavity 40, that is, the fluid passage 20 is a spiral or spiral-like fluid passage, wherein an opening 21 of the fluid passage 20 is in communication with the fluid accommodation cavity 40. Wherein, before the cover 12 is sealed to the base 11, the light-impermeable fluid 30 is injected into the fluid accommodation cavity 40, and then the fluid passage 20 and the fluid accommodation cavity 40 are sealed to form the fluid passage 20 and the fluid accommodation cavity 40 to seal the light-impermeable fluid 30 in the fluid accommodation cavity 40 and the fluid passage 20, and thus the light-impermeable fluid can flow back and forth in the fluid accommodation cavity 40 and the fluid passage 20 without leakage. Wherein, the driving unit 50 is provided at periphery of the main body 10 of the variable aperture 100, such as top and bottom or the side, and acts on the light impermeable fluid 30 in fluid accommodation cavity 40 through a side wall, an upper wall or a lower wall of the main body 10 of the variable aperture 100 to drives the light-impermeable fluid 30 to flow back and forth between the fluid accommodation cavity 40 and the fluid passage 20 to implement the variable aperture.

The light-impermeable region 102 is formed by spraying black paint or coating or attaching a light-impermeable material or plating a light-impermeable film etc. on an outer peripheral side wall of the base 11, and a circular shaped light-permeable light-transmitting region 101 is made in the middle of the base 11. That is to say, the light-transmitting region 101 is a circular-shaped light-transmitting surface in the middle of the base, and the front and back surfaces and peripheral sidewalls of the light-transmitting region 101 of the base 11 are painted or coated to form the light-impermeable region 102, allowing only the light that entering the light-passing region of the camera module 200 to pass through the light-transmitting region 101, while light from other directions, such as stray light reflected or refracted from the side of camera module 200, is totally blocked by light-impermeable region 102, preventing the stray light from entering light-transmitting region 101, thereby ensuring the controllability of the amount of light entering and eliminating the influence of stray light.

It is understandable that the base 11 can be a transparent glass plate, a resin plate, or a transparent plastic plate, or a square plate, inclined plate, or circular or ellipse plate made of other transparent objects. The shape and size of the base 11 is preferably a square plate to match the shape and size of the light-in region of the camera module 200. The front and back surfaces and side surfaces of the base periphery are coated with black paint or metal film etc. to form the light-impermeable region 102 that does not transmit light, wherein the circular light-transmitting region 101 is reserved on the top and bottom sides of the base 11 in the middle (that is, the top and bottom sides of base 11 is not painted or coated to retain light transmission). Of course, the light-transmitting region 101 can also be a square light-transmitting region, or it may be a light-transmitting area of an irregular pattern or any other shapes.

The cover 12 is a square object made of a transparent glass plate or a transparent plastic plate or other transparent objects, wherein the size and shape of the cover 12 are approximately equal to the size and shape of the base 11, and the surfaces of the lower side of cover 12 and base 11 are relatively flat, so that the cover 12 can seal the fluid groove 111 and the cavity groove 112 well, wherein the cover 12 does not affect the amount of light transmission in the light-transmitting region 101 of base 11. It can be seen that the variable aperture device 100 is made of only two layers of thin plates. As it's relatively thin, it's suitable for mounting in a mobile phone, giving the mobile phone the function of adjusting the variable aperture.

In this embodiment, the cover 12 is adhesively sealed on the bottom side of the base 11, by using solid glue, glass glue, liquid glue, or light glue, or the cover 12 is integrally thermoplasticly sealed on the bottom side of the base 11, or the cover 12 is in an integral structure of the base 11, or the like.

As shown in FIG. 2, preferably, the fluid groove 111 is formed by etching on the bottom side of the light-transmitting region 101 of the base 11, wherein the fluid groove 111 spirals from the center of the light-transmitting region 101, extending outwards to the light-impermeable region 102 (preferably, the center of the fluid groove 111 is the center of the base 11 and also the center of the light-transmitting region 101), that is, the outermost ring of the fluid groove 111 and light-impermeable region 102 are in connected together, and the fluid groove 111 can preferably cover all the area of the light-transmitting region 101. That is, the fluid groove 111 is formed on the bottom side of the base 11 by etching, and then the light-impermeable region 102 is formed by painting or plating the top and bottom sides of the periphery of the fluid groove 111 of the base 11 and the side wall surface of the base 11. That is, only the top and bottom sides of the fluid groove 111 of the base 11 are not painted or coated, so as to reserve the light-transmitting region 101.

Preferably, the fluid groove 111 is a circular one-way spiral groove, making the fluid passage 20 a round-like one-way spiral channel, so that the light-transmitting area of the light-transmitting region 101 is round-like shape. When the light-impermeable fluid 30 gradually spirals back and forth along the fluid passage 20, the shape of the light-transmitting area of the light-transmitting region 101 is always maintained in a circular shape, which is beneficial to the lighting effect of the camera module 200. Moreover, it can be seen that through etching technology, the fluid groove 111 can be etched into any shape, such as a square groove, a triangular groove, a diamond groove or an elliptical groove, etc., to adapt to the light-passing hole of different types of camera modules. In addition, a width of a groove body of the fluid groove 111 may also be gradually increased, gradually decreased, or partially increased or partially decreased, etc., which is not limited here.

Specifically, the fluid groove 111 is annularly formed by a plurality of concentric rings 110, wherein each of the concentric rings 110 are sequentially connected from outside to inside to form the spiral fluid groove 111, preferably, the widths of the concentric rings 110 are equal, so that the fluid groove 111 is provided as a uniform spiral groove. Of course, the width of the concentric ring 110 may also be partially equal, partially unequal, or all unequal, so that the widths of a part of the fluid groove 111 ring segments are not equal, so that the flow rate of light-impermeable fluid 30 in different ring segments of fluid groove 111 can be controlled to adapt to the adjustment of the change rate of the amount of light entering in different types of camera modules.

Further, an inner diameter of the fluid groove 111 is uniform, so that the inner wall of the formed fluid passage 20 is smooth, uniform, and free of potholes, etc., so that the light-impermeable fluid 30 can flows back and forth along the fluid passage 20 evenly, and the light-impermeable fluid 30 will not stick to or remain on the inner wall of the fluid passage 20, ensuring the light transmission effect of the light-transmitting region 101. Wherein, a radial cross-section of the fluid passage 20 should not be too large to prevent the volume of the light-impermeable fluid 30 entering the fluid passage 20 from being too much, so that the light-impermeable fluid 30 can flow in the fluid passage 20 with least influence of gravity to ensure that the light-impermeable fluid 30 can only be driven by the driving unit 50 to flow back and forth, that is, to ensure controllability.

Correspondingly, the groove opening 1111 of the fluid groove 111 on the bottom side of the base 11 is integrally etched to form the cavity groove 112, wherein the cavity groove 112 is etched between the side walls of the fluid groove 111 and the base 11. When the cover 12 is sealed on the bottom side of the base 11, the fluid accommodation cavity 40 is in communication with the passage opening 21 of the fluid passage 20, so that the light-impermeable fluid 30 can spirally flow back and forth along the fluid passage 20 and into the fluid accommodation cavity 40.

It can be understood that the cavity groove 112 is located in the light-impermeable region 102. In the etching process, the fluid groove 111 and the cavity groove 112 are formed by etching on the bottom side of the base, and then the light-impermeable region 102 is formed by painting or coating, wherein the cavity groove 112 is located in the light-impermeable region 102, the fluid groove 111 is located in the light-transmitting region 101, and then the cover 12 is hermetically attached to the bottom side of the base 11, making the fluid groove 111 sealed to form the fluid passage 20 and making the cavity groove 112 sealed to form the fluid accommodation cavity 40, wherein the top and bottom sides of the fluid passage 20 of the base 11 are the light-transmitting region 101, and other region is the light-impermeable region 102, that is, the fluid accommodation cavity 40 is located in the light-impermeable region 102 to prevent the adjustment of the controllable light-transmitting area of the light-transmitting region 101 from being affected. Correspondingly, when the fluid passage 20 is filled with the light-impermeable fluid 30, the light-transmitting area of the light-transmitting region 101 reaches a minimum value, and when all the light-impermeable fluid 30 flows out of the fluid passage 20 and enters the fluid accommodation cavity 40, the light-transmitting area of the light-transmitting region 101 reaches the maximum value.

It is worth mentioning that a small center surface 113 is reserved in the center of the base 11, and the groove core 1112 of the fluid groove 111 is extended to the center surface 113, so that the light-impermeable fluid 30 cannot continue to flow into the central surface 113 of the base, ensuring incomplete blocking of the light-transmitting region 101 by the light-impermeable fluid 30, that is, the minimum value of the light-transmitting area of the light-transmitting region 101 is equal to that of the central surface 113, which achieving the minimum light transmission of the variable aperture device 100. Moreover, when the area of the central surface 113 is close to or equal to zero, the light-transmitting area of the light-transmitting region 101 is zero, and the light transmission amount of the variable aperture device 100 is zero.

The fluid accommodation cavity 40 is preferably a cuboid cavity. Of course, in the manufacturing process, it may also be a cavity of any other shape. The fluid accommodation cavity 40 can store a certain volume of the light-impermeable fluid 30, and the volume of the fluid accommodation cavity 40 is slightly greater than or equal to the volume of the fluid passage 20, so that the light-impermeable fluid 30 can be driven to be completely stored in the fluid accommodation cavity 40, enabling the light-impermeable fluid 30 to be driven to flow out of the fluid passage 20 without blocking the light-transmitting region 101, so as to achieve the maximum transmitting area of the light-transmitting region 101 of the variable aperture device 200.

In this preferred embodiment, the light-impermeable fluid 30 is totally pre-stored in the fluid accommodation cavity 40. Before operation, the amount of light entering in the variable aperture device 100 is at the maximum state. During operation, when the light-transmitting fluid 30 flows into the fluid passage 20 from the fluid accommodation cavity 40, the amount of light entering the variable aperture decreases, and when it flows back to the fluid accommodation cavity 40, the amount of light entering the variable aperture increases, making the amount of light entering the variable aperture decreasing and then restoring. It is understandable that the light-impermeable fluid 30 can also be originally stored in the fluid passage 20. Before operation, the amount of light entering in the variable aperture device 100 is in a minimum state. During operation, when the light-impermeable fluid 30 flows from the fluid passage 20 into the fluid accommodation cavity 40, the amount of light entering the variable aperture increases, and when it flows back to the fluid passage 20, the amount of light entering the variable aperture decreases, making the amount of light entering the aperture increasing and then restoring. That is to say, the basic principles of the embodiment in which the light-impermeable fluid 30 is pre-stored in the fluid passage 20 making the amount of light entering increasing from a small amount and then restoring and the embodiment in which the light-impermeable fluid 30 is pre-stored in the fluid accommodation cavity 40 making the amount of light entering the aperture decreasing and then restoring are just the opposite. In other words, the light-impermeable fluid can be totally remained in the fluid accommodation cavity or totally stored in the fluid passage when not in operation. Therefore, preferably, in this embodiment, the light-impermeable fluid 30 is pre-stored in the fluid accommodation cavity 40, and the amount of light entering the aperture is decreased and then restored. As being detailed described, it should be understood by those skilled in the art that both the embodiments should be within the protection scope of the present invention.

Figure 11:
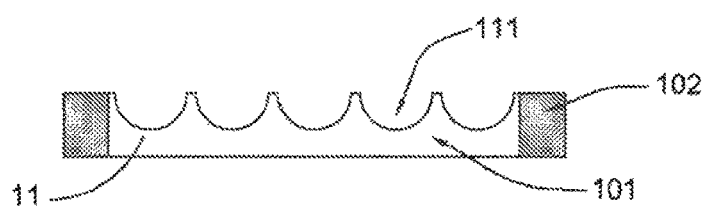
FIG. 11 is a schematic view of production of an arc-shaped fluid groove of the base in the manufacturing process of the variable aperture device according to a preferred embodiment of the present invention.
Figure 12:
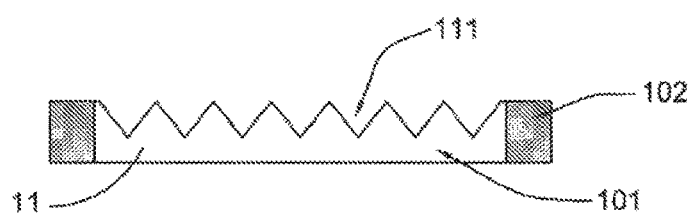
FIG. 12 is a schematic view of production of a V-shaped fluid groove of the base in the manufacturing process of the variable aperture device according to a preferred embodiment of the present invention.
Figure 13:
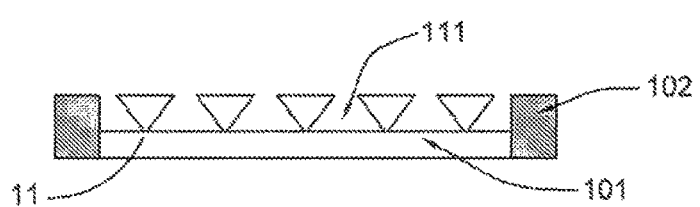
FIG. 13 is a schematic view of the production of a trapezoidal fluid groove of the base in the manufacturing process of the variable aperture device according to a preferred embodiment of the present invention.
Figure 14:
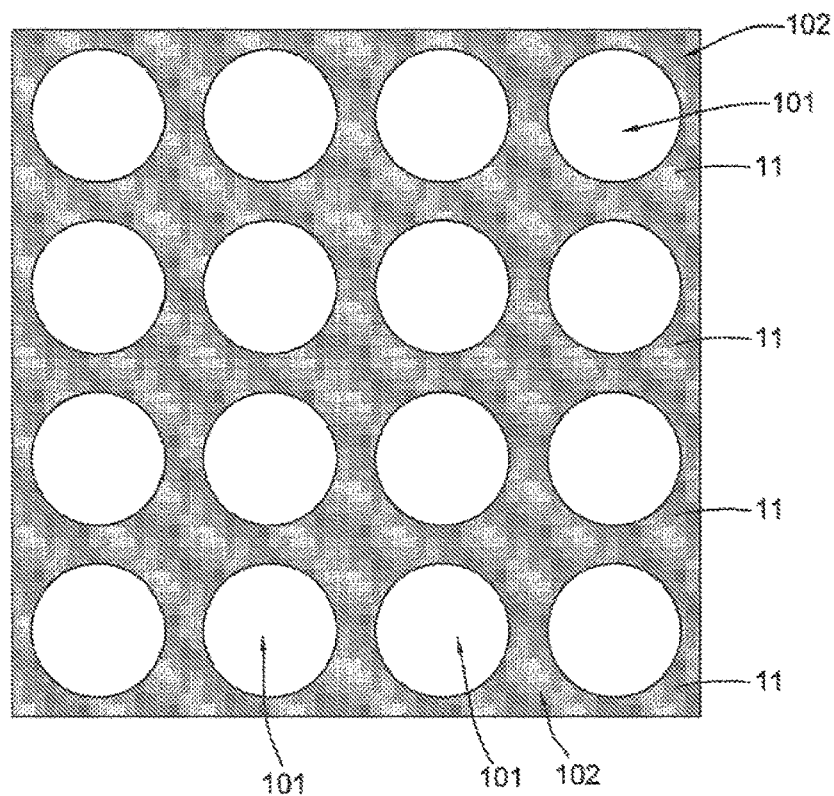
FIG. 14 is a schematic diagram of mass production of the base in the manufacturing process of the variable aperture device according to a preferred embodiment of the present invention.
Figure 15:
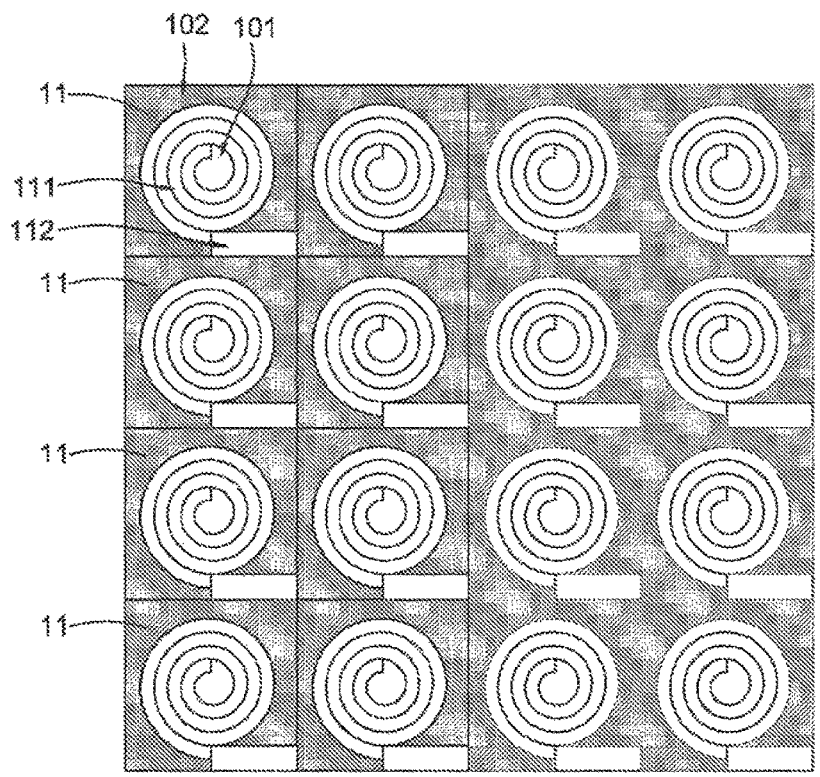
FIG. 15 is a schematic view of mass production of the fluid groove and the cavity groove of the base in the manufacturing process of the variable aperture device according to a preferred embodiment of the present invention.
Figure 16:
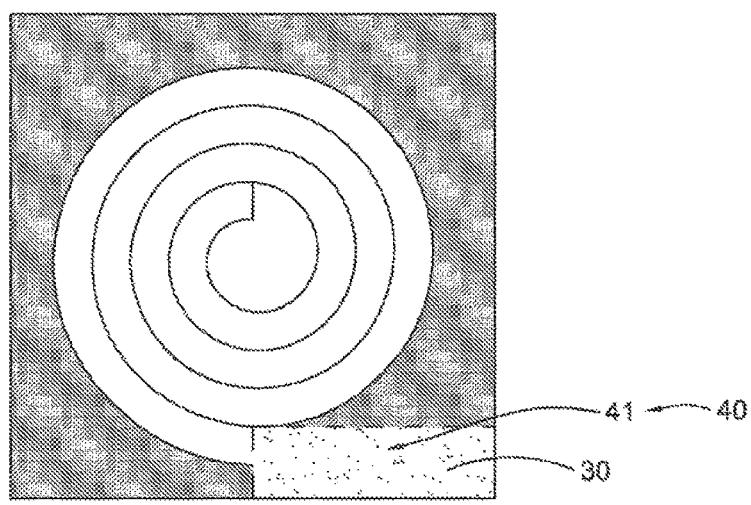
FIG. 16 is a schematic view of production process of filling the cavity groove of the base with light-impermeable fluid in the manufacturing process of the variable aperture device according to a preferred embodiment of the present invention.
Figure 17:
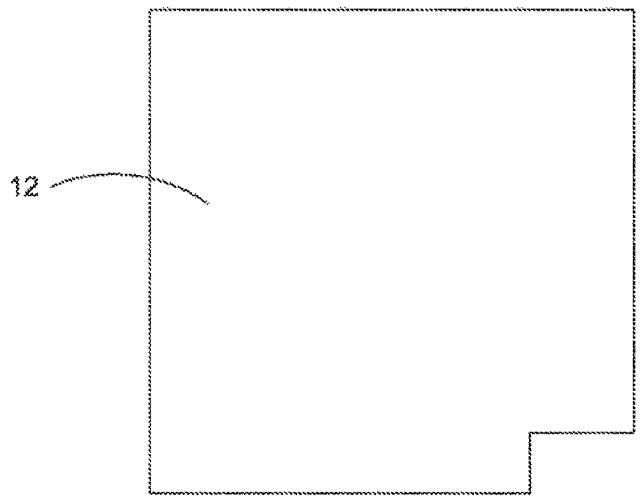
FIG. 17 is a schematic diagram of production of the cover in the manufacturing process of the variable aperture device according to a preferred embodiment of the present invention.
Figure 18:
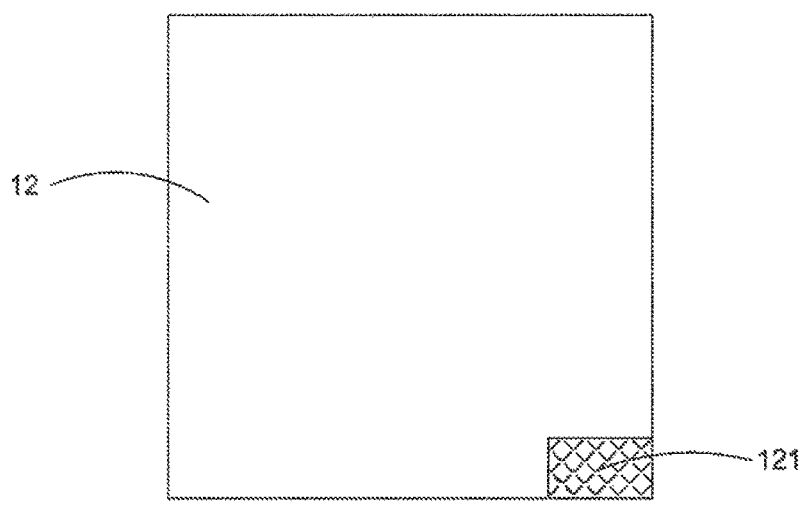
FIG. 18 is a schematic view of production of a mounting position of the cover in the manufacturing process of the variable aperture device according to a preferred embodiment of the present invention.
Figure 19:
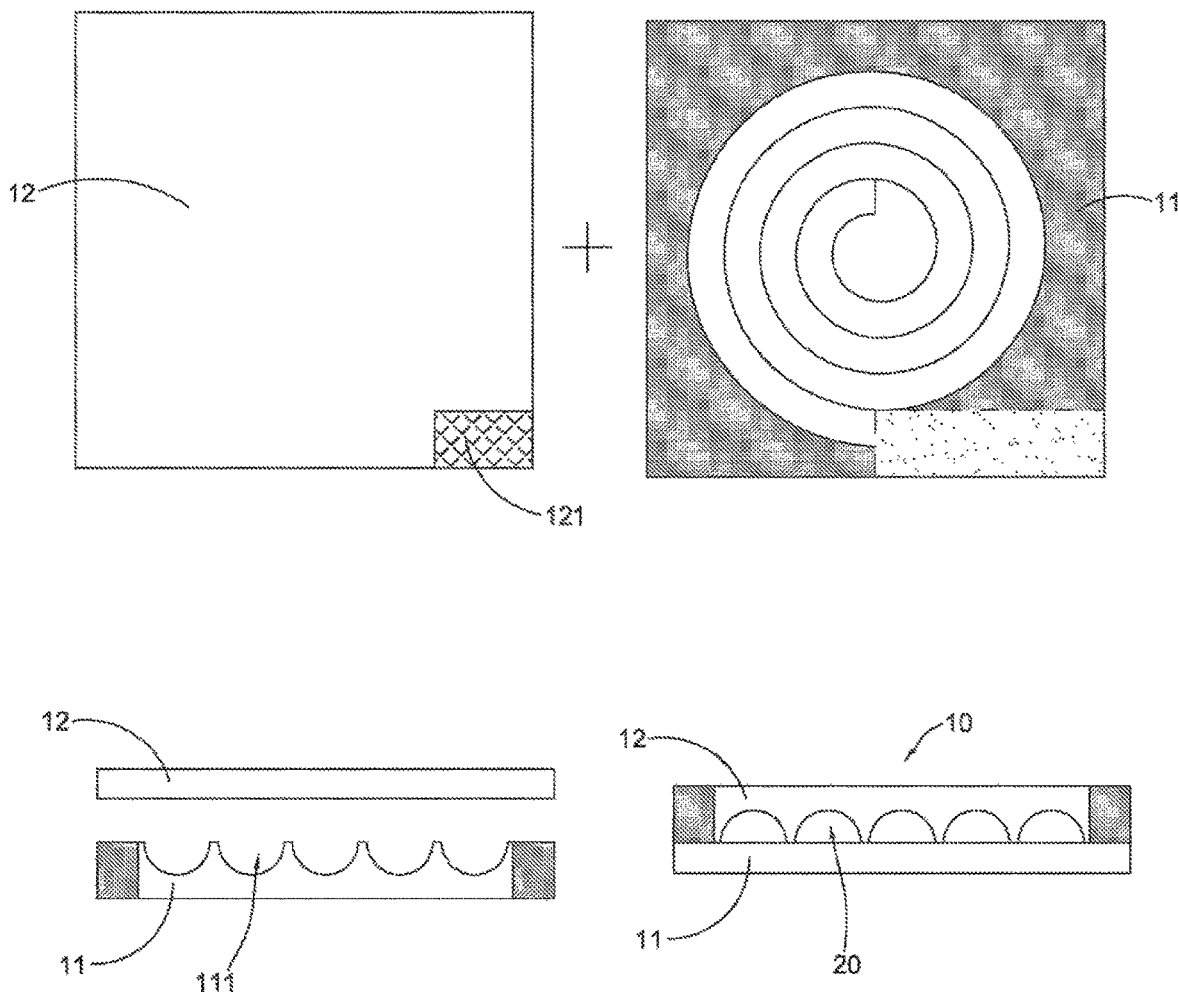
FIG. 19 is a schematic view of production of the main body by assembling the base and the cover in the manufacturing process of the variable aperture device according to a preferred embodiment of the present invention.
Figure 20:
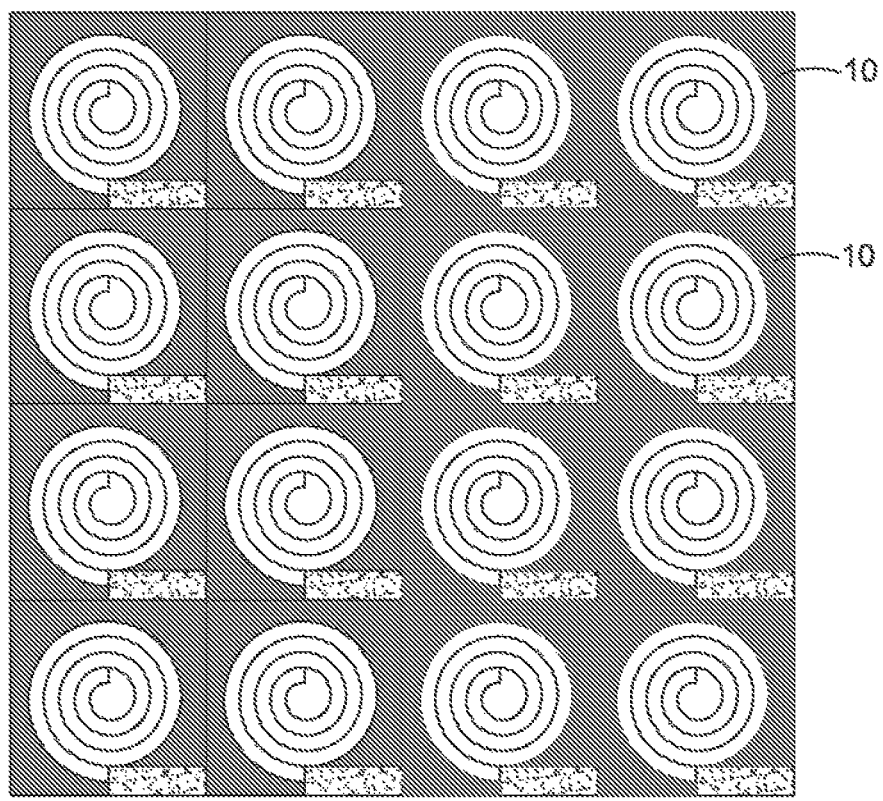
FIG. 20 is a schematic diagram of mass manufacturing of the main body in the manufacturing process of the variable aperture device according to a preferred embodiment of the present invention.

As shown in FIGS. 11 to 13, further, the shape of the inner wall of the fluid groove 111 may be an arc groove, that is, the bottom of the fluid groove 111 is an arc, and the edge of the fluid groove 111 gradually narrows, that is, the width of the fluid groove 111 gradually increases from bottom to top. Preferably, the narrower the edge of the groove, the better, as it makes the total maximum radial cross-sectional area of the fluid passage 20 occupying almost all the area of the light-transmitting region 101. In other words, when the light-impermeable fluid 30 is filled into the fluid passage 20, the external light can hardly pass through the wall of the fluid passage 20 and is completely blocked by the light-impermeable fluid 30.

Of course, the shape of the inner wall of the fluid groove 111 can also be V-shaped, wherein the bottom of the fluid groove 111 is V-shaped, and the groove edge of the fluid groove 111 is a pointed shape, making the total groove surface area of the fluid groove 111 equaling to the area of the light-transmitting region 101, and also enabling the light-impermeable fluid 30 in the fluid passage 20 to completely block the external light without leaking from the wall of the fluid passage 20.

It can be understood that the groove edges of the fluid groove 111 are in the same plane as the plane of the bottom side of the base 11, and when the cover 12 is sealed to the bottom side of the base 11 to form the fluid passage 20, any two adjacent channels of the fluid passage 20 are not in communication with each other, that is, all walls of the fluid passage 20 are sealed to the plane of the main body 12, thereby preventing the light-impermeable fluid 30 from crossing the walls of the fluid passage 20 and directly entering into adjacent channels (that is, the light-impermeable fluid 30 can only flow back and forth in a spiral shape along the fluid passage 20) or leaking from both sides of the base 11.

In addition, the internal shape of the fluid groove 111 may also be a trapezoidal groove or an inverted V-shaped groove, that is, the groove bottom of the fluid groove 111 is wider than the groove top of the fluid groove 111, wherein the thinner the two side walls of the groove bottom, the better. It makes the total of radial area of the groove bottom of the fluid groove 111 is approximately equal to the area of the light-transmitting region 101. When the fluid passage 20 is formed, the light-impermeable fluid 30 completely blocks the light-transmitting area of the light-transmitting region 101 at the bottom of the fluid passage 20. It can be seen that the larger the planar width of the groove edge of the fluid groove 111 (i.e. the larger the hermetically area of the fluid groove 111 of the cover 12 and the base 11), the better the hermetical effect and the more convenient the sealing.

It can be understood that the center of the fluid groove 111 is blocked. When the fluid groove 111 is sealed by the cover 12 to form the fluid passage 20, the center of the fluid passage 20 is closed, that is, the fluid passage 20 has only one passage opening 21 in communication with the fluid accommodation cavity 40. When the driving unit 50 generates the force to drive the light-impermeable fluid 30 into the fluid passage 20, the air in the fluid passage 20 is in a compressed state. Under normal circumstances, the volume of the fluid passage 20 is small, and the internal air pressure is small, which can be approximated to a vacuum state, so that the force generated by the driving unit 50 can be even and does not need to be too strong to complete the adjustment of the amount of light entering the variable aperture, making it convenient for precise operation and improving accuracy. When the force of the driving unit 50 gradually disappears, the compressed air in the fluid passage 20 gradually pushes the light-impermeable fluid 30 out of the fluid passage 20 and gradually returning to the fluid accommodation cavity 40, or the driving unit 50 may also generate a negative pressure (or suction) in the fluid accommodation cavity 40 to drive the light-impermeable fluid 30 to flow back to the fluid accommodation cavity 40, thereby completing the controllable adjustment of the light entering the variable aperture.

As shown in FIG. 2, in this embodiment, the variable aperture device 100 further includes a separator 60, wherein the separator 60 is provided in the fluid accommodation cavity 40 to divide the fluid accommodation cavity 40 into a fluid cavity 41 and a gas cavity 42. The fluid cavity 41 is in communication with the fluid passage 20, and the light-impermeable fluid 30 is stored in the fluid cavity 41. The gas cavity 42 is in an airtight state and is used to store a gas 421 (that is, the gas cavity 42 neither communicates with the fluid cavity 41 nor communicates with the fluid passage 20), wherein the separator 60 isolates the gas 421 in the gas cavity 42 and the light-impermeable fluid 30 in the fluid cavity 41 from each other, that is, the separator 60 allows no air or fluid to pass.

The separator 60 is a flexible, air-tight film or membrane. When subjected to external pressure, the separator 60 can transform, being stretched and bent, and the surface area increases. And when the external pressure disappears, the separator 60 can be restored to the previous state. Preferably, the edge of the separator 60 is fixedly connected to the middle of the inner wall of the fluid accommodation cavity 40 of the base 11, and when the separator 60 is subjected to an external force, the edge of the separator 60 will not fall off or move. The middle part of the separator 60 will transform to produce a protrution (i.e. the surface area is increased), and the volume of the fluid cavity 41 and the gas cavity 42 will be relatively changed (that is, when the volume of the fluid cavity 41 increases, the volume of the gas cavity 42 decreases, and when the volume of the gas cavity 42 increases, the volume of the fluid cavity decreases). When the external force disappears, the separator 60 returns to the normal state, and the volumes of the fluid cavity 41 and the gas cavity 42 also return to the previous status.

Figure 5:
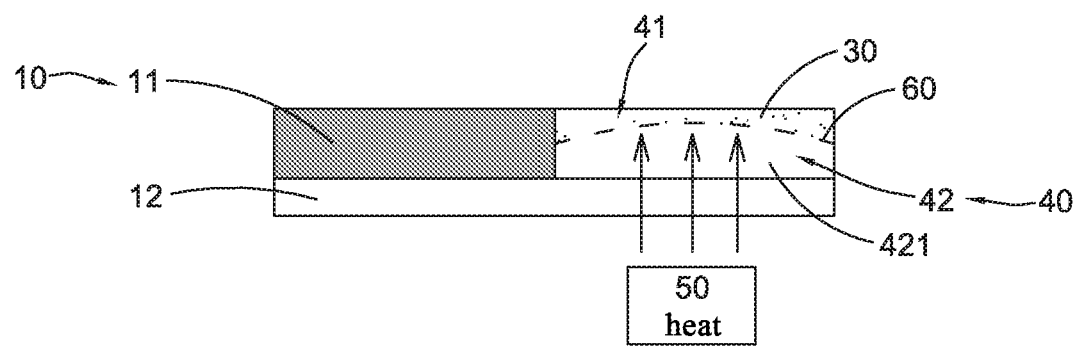
FIG. 5 is a schematic cross-sectional view showing that the variable aperture device drives light-impermeable fluid upward with heat according to a preferred embodiment of the present invention.

As shown in FIG. 5, preferably, the driving unit 50 is provided to transfer heat to the peripheral wall of the gas cavity 42 of the base 11, by making the temperature of the wall of the gas cavity 42 of the fluid accommodation cavity 40 of the base 11 rising, allowing the gas 421 in the gas cavity 42 expands to produce a force acting on the separator 60, which in turn causes the separator 60 to protrude toward the fluid cavity 41, reducing the volume of the fluid cavity 41, and then squeezing the fluid in the fluid cavity 41 into the fluid passage 20, thereby reducing the light-transmitting area of the light-transmitting region 101, and completing the reduction of the variable aperture. When the heat transferring of the driving unit 50 to the gas cavity 42 is canceled, the temperature in the gas cavity 42 gradually decreases, reducing the gas volume in the gas cavity 42, and restoring the separator 60 and the volume of the fluid cavity 41 (increased to the normal volume), and then negative pressure is generated in the fluid cavity 41, sucking the fluid in the fluid passage 20 is back into the fluid cavity 41, thereby restoring the light-transmitting area of the light-transmitting region 101 (increase to the normal light-transmitting area), and completing the expansion (or restoration) of the variable aperture.

Preferably, the driving unit 50 may be a temperature control device, such as a heating device or a cooling device, like a resistance wire, an electric heater, etc., or a device with a heating unit like a heater or a cooling device like a condenser, or a device with both heating and cooling effect, etc., wherein the heating part or the cooling part of the driving unit 50 is provided indirectly or directly in contact with the outer side of the gas cavity 42 of the main body 10, and the driving unit 50 heats or cools the gas 421 by generating heat or absorbing heat and directly (such as contact heat transfer) or indirectly (such as air heat transfer) transferring or absorbing heat of the gas cavity 42 to heat or cool the gas 421. Of course, the interactive interface of the driving unit 50 can be set on the camera module 200 or the smart mobile device, or the interactive interface is an APP, etc., for the user to control the driving unit 50. The light-transmitting area of the light-transmitting region 101 of the variable aperture 100 controls the amount of light entering the camera module 200.

Further, the separator 60 may be transversely provided in the middle of the fluid accommodation cavity 40, that is, the separator 60 isolates the fluid cavity 41 and the gas cavity 42 up and down, wherein the height of the fluid passage 20 is not greater than the height of the fluid cavity 41, that is, the gas cavity 42 is not in communication with the fluid passage 20. When the gas 421 in the gas cavity 42 is heated and expanded, the separator 60 protrudes upward, and then the light-impermeable fluid 30 in the fluid cavity 41 is squeezed into the fluid passage 20. Accordingly, when the temperature decreases, the separator 60 returns downward to its original state. That is, the fluid cavity 41 is located below the gas cavity 42. It means that the fluid cavity 41 is on the bottom side of the base 11 and in contact with the cover 12 (formed by sealing the bottom side of the base 11 with the cover 12). The fluid cavity 41 is in communication with the fluid passage 20, and the gas cavity 42 is located above the fluid cavity 41 and does not communicate with the fluid passage 20 (because the height of the fluid passage 20 is not greater than the height of the fluid cavity 41, it cannot be in communication with the fluid cavity 41). The driving unit 50 is adhesively attached and mounted on the top side of the base 11 by liquid glue (or solid glue) corresponding to the gas cavity 42 (above the gas cavity 42) for transferring heat through the base 11 to the gas cavity 42. Of course, the fixing method of the driving unit 50 can also be screw connection, clamping connection, extrusion, etc. Alternatively, the driving unit 50 is provided above the base 11 without contacting the base 11, transmitting heat to the base 11 by air diffusion, thereby heating the air in the gas cavity 42.

Figure 6:
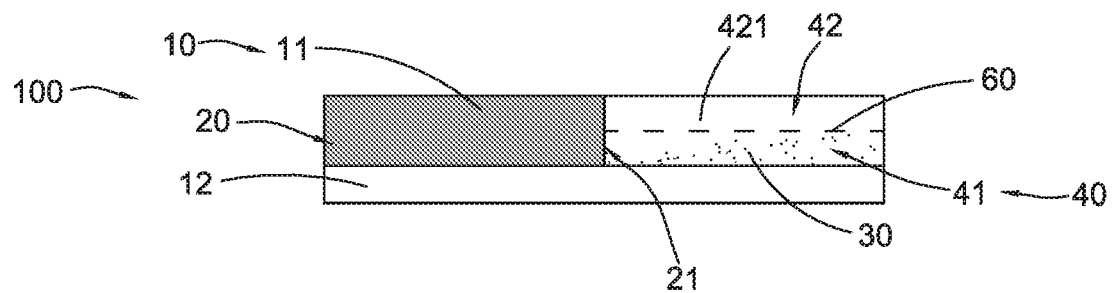
FIG. 6 is a schematic cross-sectional view of another example of storing light-impermeable fluid by the variable aperture device according to a preferred embodiment of the present invention.
Figure 7:
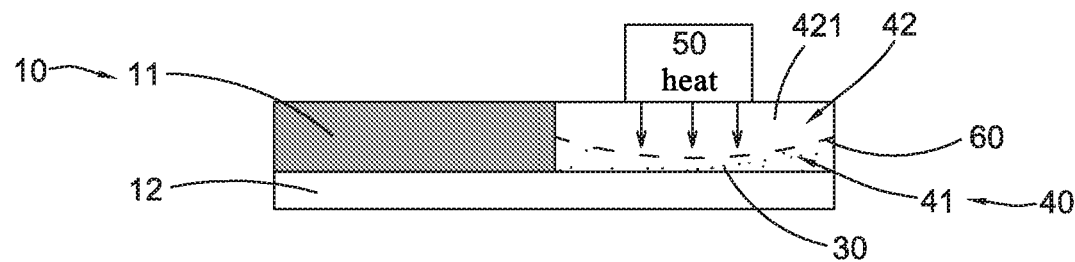
FIG. 7 is a schematic cross-sectional view showing that the variable aperture device drives light-impermeable fluid downward with heat according to a preferred embodiment of the present invention.
Figure 8:
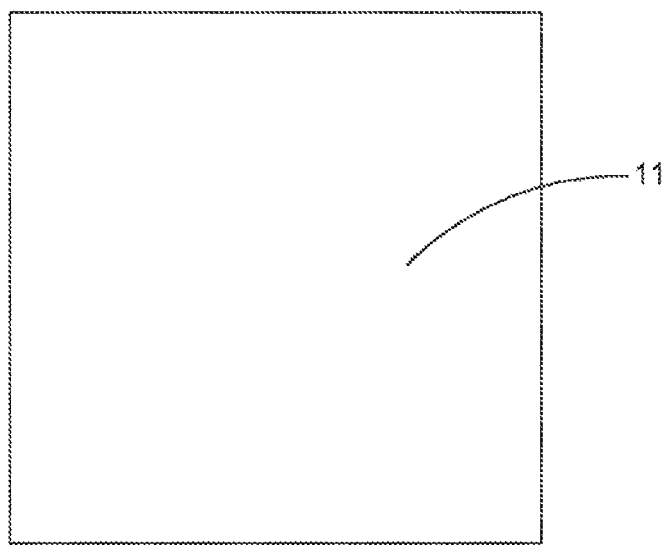
FIG. 8 is a schematic diagram of production of the base in the manufacturing process of the variable aperture device according to a preferred embodiment of the present invention.
Figure 9:
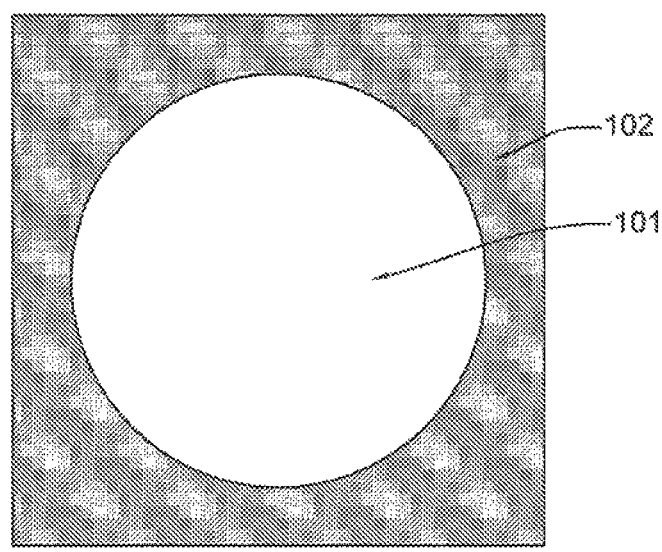
FIG. 9 is a schematic diagram of production of the light-impermeable region of the base in the manufacturing process of the variable aperture device according to a preferred embodiment of the present invention.
Figure 10:
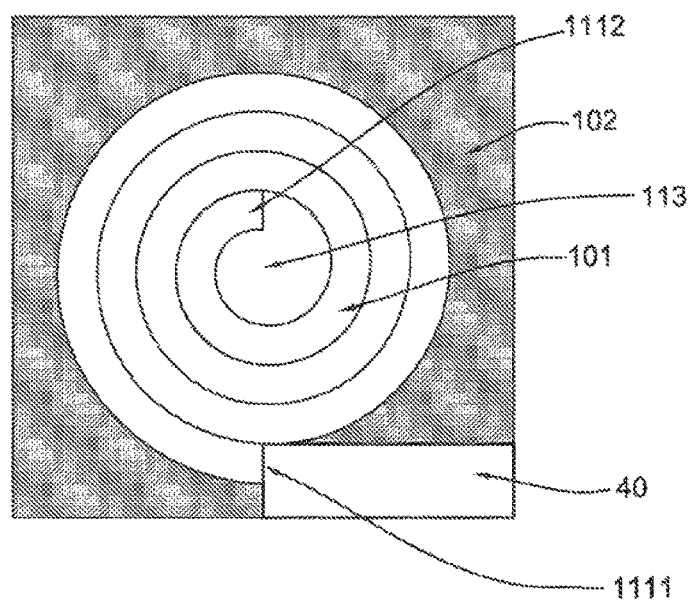
FIG. 10 is a schematic view of production of a fluid groove and a cavity groove of the base in the manufacturing process of the variable aperture device according to a preferred embodiment of the present invention.

As shown in FIGS. 6 and 7, or, in another embodiment, the fluid cavity 41 is located above the gas cavity 42, that is, the gas cavity 41 is in contact with the cover 12 on the bottom side of the base 11, wherein the height of the fluid passage 20 is greater than the height of the gas cavity 42, so that the fluid passage 20 communicates with the fluid cavity 41, wherein three sides of the separator 60 are hermetical fixed to the inner wall of the fluid accommodation cavity 40 to separate the gas cavity 42 and the fluid cavity 41, and the other side of the separator 60 (i.e. a free side, a side adjacent to the fluid passage 20) is adhesively sealed and fixed to the cover 12 to isolate the gas cavity 42 and the fluid passage 20. Alternatively, in the manufacturing process, the base 11 reserves a baffle at the passage opening 21 for isolating the fluid passage 20 and the gas cavity 42, wherein the periphery of the separator 60 is sealed in and provided on the baffle and the inner wall of the fluid accommodation cavity 40 for isolating the fluid cavity 41 and the gas cavity 42. The driving unit 50 is attached and mounted on the cover 12, corresponding to the gas cavity 41 (i.e. located below the gas cavity 41). By heating the cover 12, the temperature of the gas cavity 41 is increased, thereby causing the gas 421 to expand.

Alternatively, in still another embodiment, the separator 60 may also be longitudinally provided in the middle of the fluid accommodation cavity 40, that is, the separator 60 isolates the fluid cavity 41 and the gas cavity 42 left and right. Wherein the fluid cavity 41 is located on the left side and communicates with the fluid passage 20, and the gas cavity 42 is sealed to store the gas 421. When the gas 421 in the gas cavity 42 is heated and expanded, the separator 60 protrudes to the left, and then the light-impermeable fluid 30 in the fluid cavity 41 is squeezed into the fluid passage 20. Accordingly, when the temperature decreases, the separator 60 returns to the original state to the right. The driving unit 50 is attached to the right side wall of the fluid accommodation cavity 40 of the main body 10 for heating the right side wall of the main body 10, increasing the temperature of the gas cavity 41 to control the expansion of the gas 421.

It is worth mentioning that the main body 10 can be cooled naturally, or by attaching a heat conduction material around the main body 10 for helping the main body 10 to conduct heat (including heating and cooling), or by generating cold air with driving unit 50 to help the main body 10 to be cooled or refrigerated.

On the contrary, in an embodiment in which the light-impermeable fluid 30 is originally stored in the fluid passage 20, making the amount of light entering increasing and then restored, before the adjustment of the aperture, the light-impermeable fluid 30 is stored in the fluid passage 20, the amount of light entering the variable aperture device 100 is at the minimum state, wherein the driving unit 50 can continuously transfer heat to expand the gas in the gas cavity 42 or generate mechanical force to act on the separator 60 to maintain the protrution towards the fluid cavity 41 and the volume of the fluid cavity 41 in a relatively small state, keeping the light-impermeable fluid 30 in the fluid passage 20 without flowing back naturally. During operation, the driving unit 50 can be manipulated to stop transferring heat or to release cold air, making the gas 421 cool down by cold air or cool dawn naturally, or to generate opposite mechanical force to restore the separator 60 and allow the light-impermeable fluid 30 to flow into the fluid cavity 41 and increasing the amount of light entering. By repeating this, the adjustment of the amount of light entering the variable aperture can be completed. Or, before the adjustment of the aperture, the gas 421 is in a normal temperature state, or the separator 60 is in a natural state, wherein the light-impermeable fluid 30 is maintained stored in the fluid passage 20. During operation, the driving unit 50 cools with the cold air, causing the gas 421 to cool down and contract, or generates mechanical force to act on the separator 60 to protrude toward the gas cavity 42 to form a negative pressure, making the volume of the gas cavity 42 smaller, and the volume of the fluid cavity 41 larger, thereby making the light-impermeable fluid 30 to flow into the fluid cavity 41 and increase the amount of light entering. When the driving unit 50 stops cooling or heats up the gas 421 to the normal temperature state, or generates an opposite mechanical force to restore the separator 60, the light-impermeable fluid 30 flows back, reducing the amount of light entering.

In the above method for adjusting the area of the effective light-transmitting region of the camera module, step a includes the steps: a1, the gas 421 is heated and expanded to cause the separator 60 to protrude; and a2, the separator 60 pushes the light-impermeable fluid 30 to flow.

Alternatively, step a includes the steps: a1A, the gas 421 is cooled to reset the separator 60; and a2A, a negative pressure is formed causing the light-impermeable fluid 30 to flow back.

In step b: the light-impermeable fluid flows into the light-impermeable region from outside to inside in a spiral shape.

In step c, the light-impermeable fluid flows out of the light-impermeable fluid from inside to outside in a spiral shape.

It's understandable that the driving unit 50 can control the amount and time of heat transferring to the gas cavity 42 of the base 11 to control the volume of the light-impermeable fluid 30 entering the fluid passage 20 and maintain the time during which the volume does not reflow, and then controls the size and duration of the light-transmitting area of the light-transmitting region 101 to control the size and duration of the light entering. That is to say, when the user operates the driving unit 50 to maintain a fixed amount of heat transferred to the gas cavity 42, maintaining the expansion of the gas in the gas cavity 42 at a fixed volume. That is, the degree of protrution of the separator 60 remains no change, compressing the fluid cavity 41 at a certain volume, maintaining a constant volume of the light-impermeable fluid 30 flowing into the fluid passage 20, so that the light-transmitting area of the light-transmitting region 101 is fixed, keeping the amount of light entering in the camera module 200 unchanged, allowing users using the same amount of light entering continuously for photography.

Correspondingly, during photography, the user can increase or decrease the temperature transmitted to the gas cavity 42 by controlling the driving unit 50, in order to increase or decrease the expansion volume of the gas 421 accordingly, thereby causing The light-impermeable fluid 30 flow back and forth in the fluid passage 20 correspondingly, and then reducing or expanding the light-transmitting area of the light-transmitting region 101.

It is understandable that the gas 421 may be air, oxygen, hydrogen, or carbon dioxide gas or other gases that can expand when being heated. It is relatively sensitive to temperature changes, and increases in volume as the temperature increases and decreases in volume as the temperature decreases.

As shown in FIGS. 8 to 24, in this preferred embodiment, in the manufacturing process, the manufacturing method of the variable aperture device 100 is as follows:

i. the fluid groove 111 and the cavity groove 112 are formed by etching the bottom side of the base, and the light-transmitting region 102 is formed by painting or coating the periphery of the fluid groove 111 of the base 11 and the side of the base 11, wherein the top and bottom sides of the fluid groove 111 of the base 11 form the light-transmitting region 101. It can be seen that the light-impermeable region 102 can also be firstly formed by painting or coating the periphery of the base 11 and the side of the base 11 (that is, the light-transmitting region 101 is reserved in the middle of the base), and then the light-transmitting region 101 in the middle of the base 11 is etched to form the fluid groove 111, and the light-impermeable region 102 of the base 11 is etched to form the cavity groove 112, wherein the cavity groove 112 and the fluid groove 111 are in communication.

Of course, in step i, the transparent material in a molten state can also be filled in a molding die 70, wherein the molding die has a spiral pattern forming the fluid groove 111 and a protrusion forming the cavity groove 112. After the transparent material is cooled and solidified, the base 11, the fluid groove 111 and the cavity groove 112 of the base 11 are formed, and then the base 11 is painted or coated to form the light-impermeable region 102.

Figure 21:
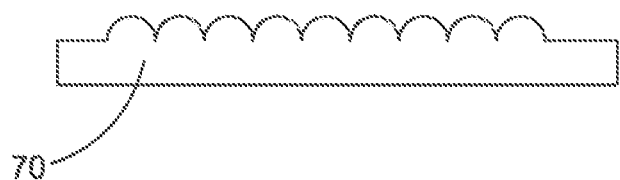
FIG. 21 is a schematic partial cross-sectional view of a molding die for molding the base in the manufacturing process of the variable aperture device according to a preferred embodiment of the present invention.
Figure 22:
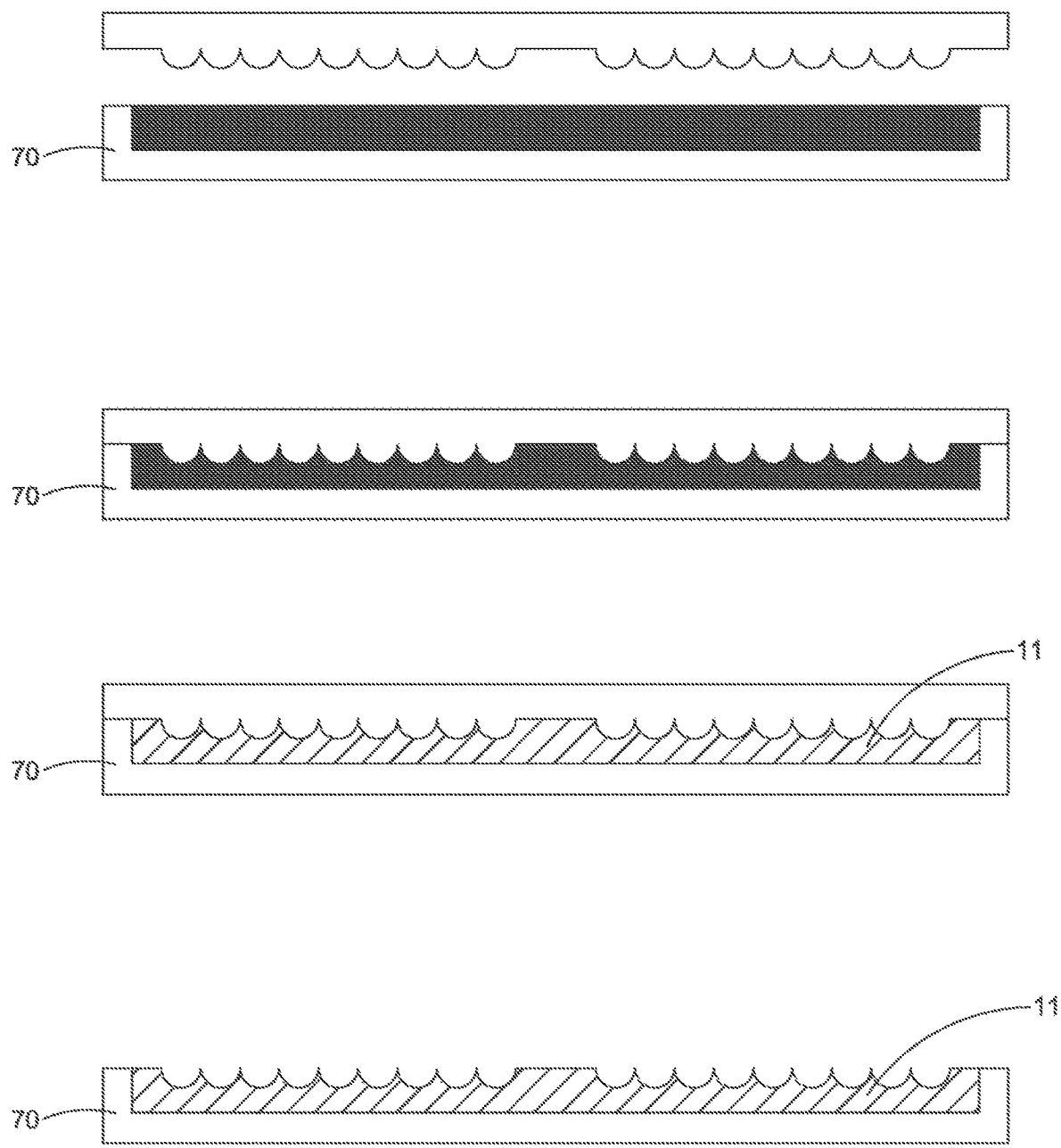
FIG. 22 is a schematic cross-sectional view of a fluid groove formed by molding a base by the molding die in the manufacturing process of the variable aperture device according to a preferred embodiment of the present invention.
Figure 23:
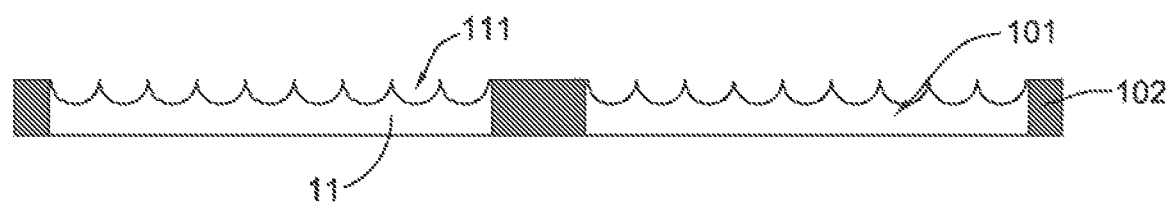
FIG. 23 is a schematic cross-sectional view of a light-impermeable region formed on a substrate in the manufacturing process of the variable aperture device according to a preferred embodiment of the present invention.
Figure 24:
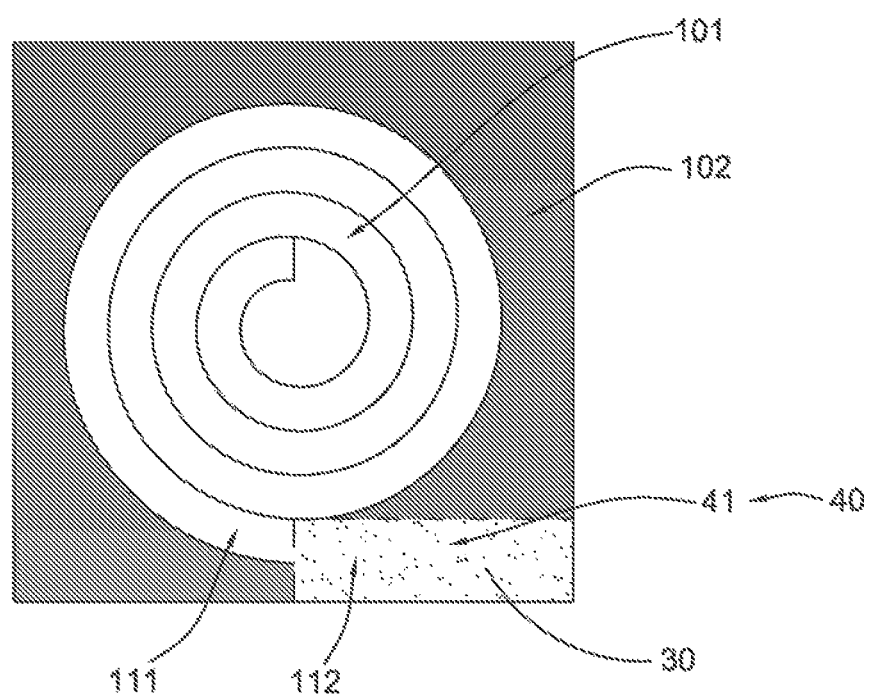
FIG. 24 is a schematic plan view of a final product of the manufacturing process of the variable aperture device according to a preferred embodiment of the present invention.

As shown in FIGS. 21 and 22, it can be understood that in the etching or molding steps, multiple molding dies 70 can be simultaneously used to form the fluid cavity 111 and the cavity groove 112 of the base 11 on the same large transparent material body, and then the base 11 can be cut and mass-produced. Similarly, another relatively large transparent material body can be cut at the same size as the base 11 to form the cover 12, wherein a mounting region 121 is reserved in advance on the cover 12 at the position corresponding to the gas cavity 42 of the base 11 for mounting the driving unit 50, so that the cover 12 can be mass-produced.

ii. the separator 60 is configured to separate the cavity groove 112 into two cavities (the fluid cavity 41 and the gas cavity 42), wherein the fluid cavity 41 is in communication with the fluid groove 111, wherein the gas cavity 42 is sealed to store the gas 421, and the fluid cavity 41 is filled with the light-impermeable fluid 30. Of course, when the separator 60 is provided, the gas 421 is filled into the gas cavity 42 firstly, and then the separator 60 is configured to seal the gas cavity 42.

iii. the cover 12 on the bottom side of the base 11 is adhesively attached and sealed to seal the fluid groove 111 to form the fluid passage 20 and seal the cavity groove 112 to form the fluid accommodation cavity 40.

iv. the driving unit 50 is provided at outer side of the main body 10 for transferring heat to the gas cavity 42 to expand the air 421, thereby driving the light-impermeable fluid 30 flowing back and forth in the fluid cavity 41 and the fluid passage 20 to complete the size adjustment of the variable aperture.

In one of the above-mentioned mounting methods of the driving unit 50, the driving unit 50 is mounted in the mounting area of the cover 12 (the mounting area corresponds to the gas cavity 42).

Figure 37:
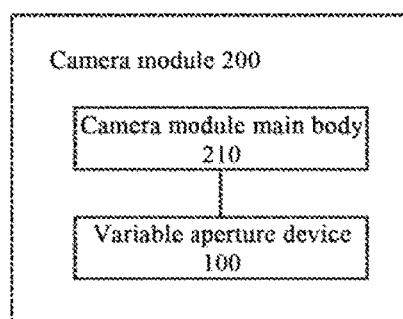
FIG. 37 is a schematic block diagram showing that the variable aperture device provided by a preferred embodiment of the present invention is applied to a camera module.

As shown in FIG. 37, the present invention also provides the camera module 200 with the variable aperture device 100, wherein the camera module 200 includes a camera module main body 210 and at least one of the aforementioned variable aperture device 100. Wherein the variable aperture device 100 is respectively mounted on the camera module main body 210 to adjust the size of the variable aperture.

As shown in FIGS. 25 to 29, a variable aperture device 100A of a first modified embodiment of the present invention includes a main body 10A, a fluid passage 20A, an light-impermeable fluid 30A, a fluid accommodation cavity 40A, and a driving unit 50A, wherein the main body 10A is provided on a camera module main body of a camera module 200A, so that the light entering or exiting the camera module main body needs to pass through or enter the main body 10A of the variable aperture device 100A, that is, the light will not leak from the side of the main body 10A, which prevents the effect on the light collecting of camera module 200A. The fluid passage 20A is provided in the main body 10A. The fluid accommodation cavity 40A is in communication with the fluid passage 20A. Wherein the driving unit 50A is operably act on the fluid accommodation cavity 40A according to the user to drive the light-impermeable fluid 30A to flow back and forth in the fluid passage 20A and the fluid accommodation cavity 40A.

When the light-impermeable fluid 30A is driven to gradually flow into the fluid passage 20A, part of the light that enters the light-impermeable fluid 30A cannot pass through the light-impermeable fluid 30A, that is, the part of the light cannot pass through the main body 10A, while the other parts of the light can still pass through the main body 10A, thereby reducing a light-transmitting area of the main body 10A, thereby reducing the amount of light entering (or the amount of light passing, the amount of light exiting, etc.).

When the light-impermeable fluid 30A is driven to flow back into the fluid accommodation cavity 40A, the light-transmitting area of the main body 10A is increased, thereby increasing the amount of light entering, so that the variable aperture device 100A can change the amount of light entering controllably.

Figure 25:
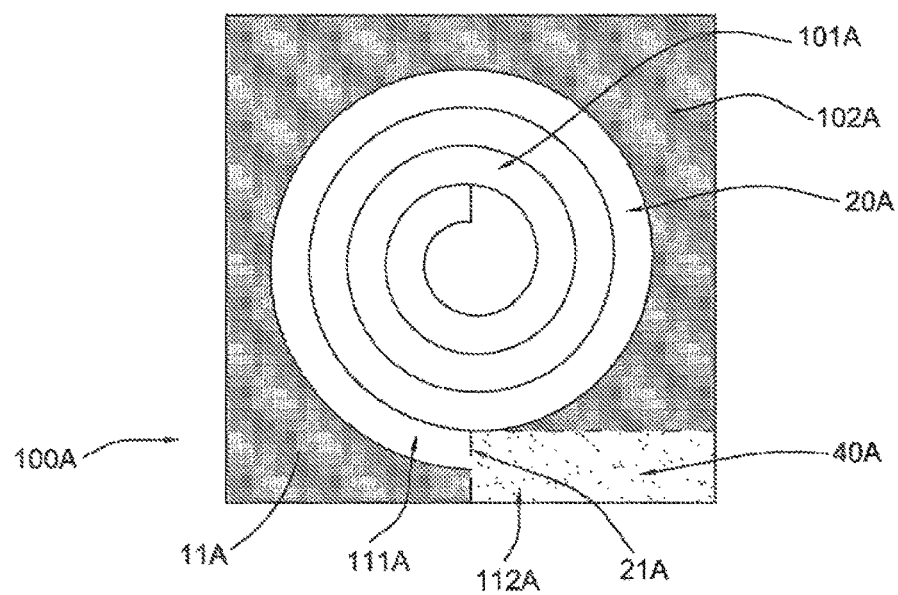
FIG. 25 is a schematic plan view of a main body of a variable aperture device according to a first modified embodiment of the present invention.

As shown in FIG. 25, in this embodiment, the main body 10A has a light-transmitting region 101A and an light-impermeable region 102A, wherein the light-transmitting region 101A is provided in the middle of the main body 10A so as to allowing the light entering the camera module to pass through the light-transmitting region 101A from the middle of the main body 10A, wherein the light-impermeable region 102A is provided on the periphery of the light-transmitting region 101A to prevent stray light from passing through the light-impermeable region 102A, eliminating the stray light from other directions (the light in the non-light-in area) from entering the light-transmitting region 101A, thereby ensuring the controllability of the light entering of the camera module.

Wherein, the fluid passage 20A is provided in the light-transmitting region 101A. When the light-impermeable fluid 30A is driven by the driving unit 50A to flow into the fluid passage 20A from the fluid accommodation cavity 40A, the light cannot pass through the area of the light-transmitting region 101A that the light-impermeable fluid 30A occupies, that is, the light-transmitting area of the light-transmitting region 101A is reduced. When the light-impermeable fluid 30A is driven to gradually enter the fluid passage 20A (i.e. the pipe length that the light-impermeable fluid 30A occupies the fluid passage 20A gradually increases), the area of the light-transmitting region 101A occupied by the light-impermeable fluid 30A gradually increases, decreasing the light-transmitting area of the light-transmitting region 101A gradually, thereby gradually reducing the amount of light passing through the main body 10A. Thus the user can controllably reduce the amount of light entering the camera module 200A, realizing the gradual reduction of the amount of light entering the variable aperture. Therefore, the variable aperture device 100A can adjust the aperture size according to the demands of the photographer, make the camera module 200A to have an adjustable depth of field and more diverse shooting effects.

When the user operates the driving unit 50A to drive the light-impermeable fluid 30A from the fluid passage 20A to gradually flow into the fluid accommodation cavity 40A, the light-impermeable fluid 30A in the fluid passage 20A gradually decreases, that is, the pipe length the light-impermeable fluid 30A occupies the fluid passage 20A gradually decreases, and the area occupied by the light-impermeable fluid 30A in the light-transmitting region 101A gradually decreases, making the light-transmitting area of the light-transmitting region 101A gradually increases, thereby allowing the amount of light passing through the main body 10A gradually increases, and the user can controllably increase the amount of light entering the camera module 200A gradually, realizing the gradual increment of the amount of light entering the variable aperture.

Figure 26:
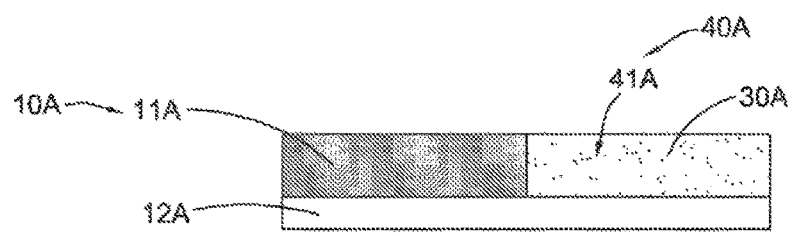
FIG. 26 is a schematic cross-sectional view of the main body of the variable aperture device according to the first modified embodiment of the present invention.
Figure 27:
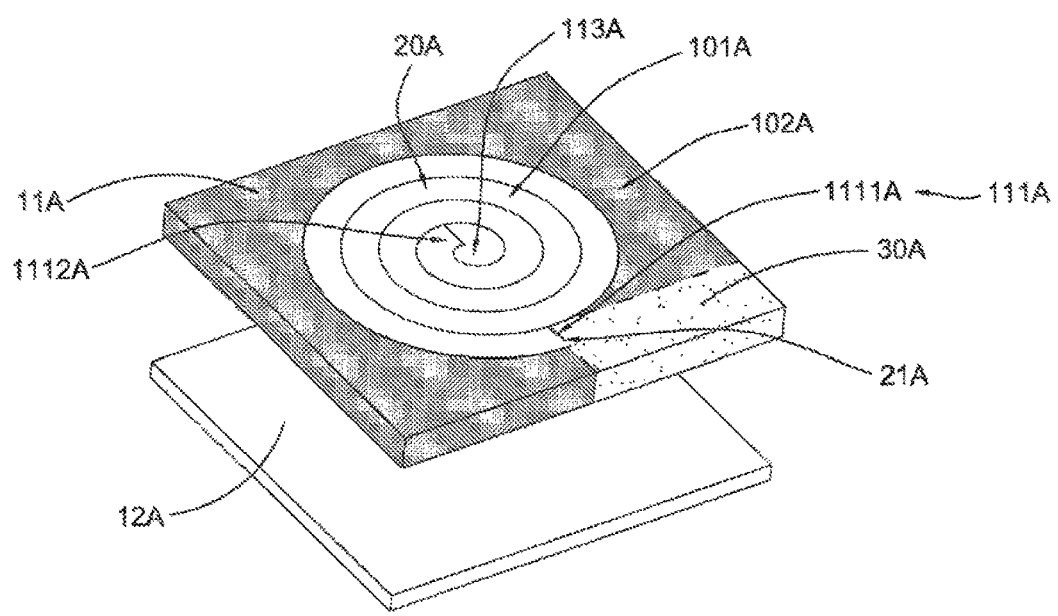
FIG. 27 is a perspective schematic view of the main body of the variable aperture device according to the first modified embodiment of the present invention.

As shown in FIGS. 26 and 27, in this embodiment, the main body 10A includes a base 11A and a cover 12A, wherein the cover 12A is hermetically mounted on one of the sides of the base 11A (for example, the bottom side), wherein the bottom side of the base 11A has a fluid groove 111A (i.e., the fluid groove 111A is a spiral channel or a spiral-like channel) and a cavity groove 112A, wherein the cavity groove 112A is provided in a groove opening 1111A of the fluid groove 111A and in communication with the fluid groove 111A. That is, the fluid groove 111A is sealed by the cover 12A to form the fluid passage 20A, and the cavity groove 112A is sealed by the cover 12A to form the fluid accommodation cavity 40A (i.e. the fluid passage 20A is a spiral or a spiral like fluid passage), wherein the passage opening 21A of the fluid passage 20A is in communication with the fluid accommodation cavity 40A. Wherein, before the cover 12A is sealed to the base 11A, the light-impermeable fluid 30A is injected into the fluid accommodation cavity 40A, and then it's sealed to form the fluid passage 20A and the fluid accommodation cavity 40A, thereby sealing the light-impermeable fluid 30A in the fluid accommodation cavity 40A and the fluid passage 20A, and allowing it to flow back and forth in the fluid accommodation cavity 40A and the fluid passage 20A without leakage. Wherein, the driving unit 50A is provided on an outer side of the base 11A, such as the top and bottom or the side, and it acts on the light-impermeable fluid 30A in the fluid accommodation cavity 40A through the side wall, or the top or lower wall of the base 11A to drive the light-impermeable fluid 30A flowing back and forth between the fluid accommodation cavity 40A and the fluid passage 20A to complete the variable aperture.

In the embodiment, the cover 12A is adhesively sealed on the bottom side of the base 11A, for example, by using solid glue, glass glue, liquid glue, or light glue or other glues, or the cover 12A is integrally thermoplasticly sealed on the bottom side of the base 11A, or the cover 12A and the cover 11A are of an integral structure, etc.

The bottom side of the light-transmitting region 101A of the base 11A is etched to form the fluid groove 111A, wherein the fluid groove 111A extends spirally from the center of the light-transmitting region 101A to the light-impermeable region 102A. That is, the outermost ring of the fluid groove 111A is integrally connected with the light-impermeable region 102A, and the fluid groove 111A can preferably cover all the area of the light-transmitting region 101A. That is, the fluid groove 111A is formed on the bottom side of the base 11A by etching, and then the top and bottom sides of the periphery of the fluid groove 111A of the base 11A and the side wall of the base 11A are painted or coated to form the light-impermeable region 102A. That is, only the top and bottom sides of the fluid groove 111A of the base are not painted or coated, so as to reserve the light-transmitting region 101A in advance.

Correspondingly, the groove opening 1111A of the fluid groove 111 on the bottom side of the base 11A is etched integrally to form the cavity groove 112A, wherein the cavity groove 112A is etched between the fluid groove 111A and the side wall of base 11A. When the cover 12A is sealed on the bottom side of the base 11A, the fluid accommodation cavity 40A is in communication with a passage opening 21A of the fluid passage 20A, so that the light-impermeable fluid 30A can spirally flows back and forth into the fluid accommodation cavity 40A along the fluid passage 20A.

It is understandable that the cavity groove 112A is located in the light-impermeable region 102A. In the etching process, the fluid groove 111A and the cavity groove 112A are formed by etching on the bottom side of the base 11A, and then the light-impermeable region 102A is formed by painting or coating, wherein the cavity groove 112A is located in the light-impermeable region 102A, the fluid groove 111A is located in the light-transmitting region 101A. Then the cover 12A is hermetically attached to the bottom side of the base 11A, sealing the fluid groove 111A to form the fluid passage 20A and sealing the cavity groove 112A to form the fluid accommodation cavity 40A. Wherein the top and bottom sides of the fluid passage 20A of the base 11A are the light-transmitting region 101A, and the other area is the light-impermeable region 102A. That is, the fluid accommodation cavity 40A is located in the light-impermeable region 102A to prevent from affecting the adjustment of the controllable light-transmitting area of the light-transmitting region 101A. Correspondingly, when the fluid passage 20A is filled with the light-impermeable fluid 30A, the light-transmitting area of the light-transmitting region 101A reaches a minimum value, and when the light-impermeable fluid 30A completely flows out of the fluid passage 20A and enters the fluid accommodation cavity 40A, the light-transmitting area of the light-transmitting region 101A reaches the maximum value.

It is worth mentioning that a center surface 113A is a small area reserved at the center of the base 11A, wherein the groove core 1112A of the fluid groove 111A is extended to the center surface 113A, so that the light-impermeable fluid 30A cannot continue to flow into the central surface 113A of the base 11A to ensure that the light-transmitting region 101A not being completely blocked by the light-impermeable fluid 30A. That is, the minimum value of the light-transmitting area of the light-transmitting region 101A is equal to that of the central surface 113A to reach the minimum light transmittance of the variable aperture device 100A. Moreover, when the area of the central surface 113A is close to or equal to zero, the light-transmitting area of the light-transmitting region 101A is zero, and the light transmission amount of the variable aperture device 100A is zero.

Figure 28:
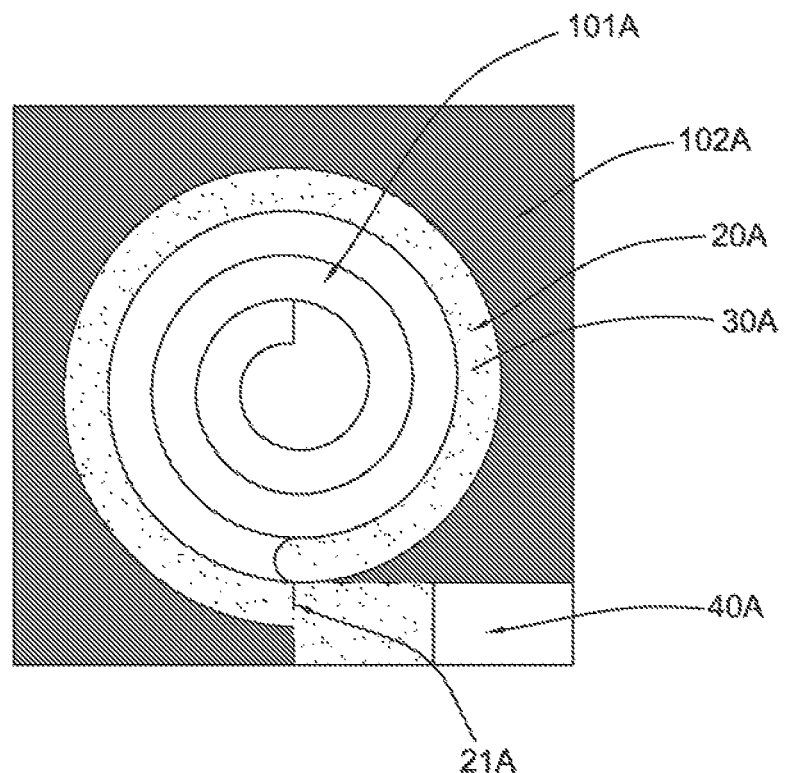
FIG. 28 is a schematic plan view of light-impermeable fluid entering a fluid passage by releasing gas of the variable aperture device according to the first modified embodiment of the present invention.
Figure 29:
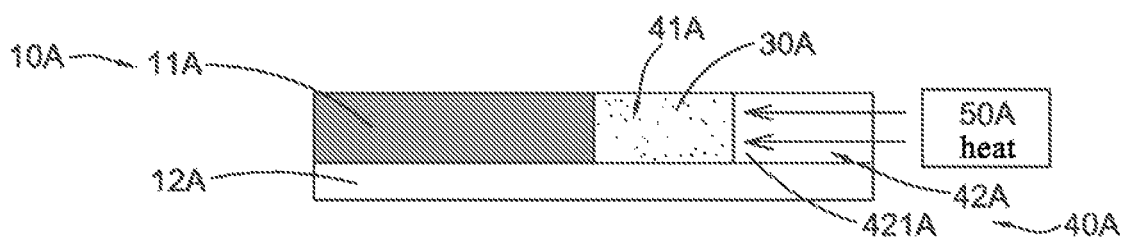
FIG. 29 is a perspective schematic diagram of the light-impermeable fluid entering the fluid passage by releasing gas of the variable aperture device according to the first modified embodiment of the present invention.

As shown in FIGS. 28 and 29, in this embodiment, gas 421A is dissolved in the light-impermeable fluid 30A, and the light-impermeable fluid 30A is heated to release the gas 421A. The driving unit 50A is provided on the outer side or top and bottom surfaces of the fluid accommodation cavity 40A of the main body 10A, wherein the driving unit 50A generates heat and transfers heat to the light-impermeable fluid 30A of the fluid accommodation cavity 40A, thereby raising the temperature of the light-impermeable fluid 30A and releasing the gas 421A to push the light-impermeable fluid 30A into the fluid passage 20A. Thus the light-transmitting area of the light-transmitting region 101A is reduced. When the temperature of the fluid accommodation cavity 40A decreases, the gas 31 is re-dissolved in the light-impermeable fluid 30A, and then a negative pressure is generated in the fluid accommodation cavity 40A, sucking the light-impermeable fluid 30A back into the fluid accommodation cavity 40A, and expanding the light-transmitting area of the light-transmitting region 101A (i.e. restoring the light-transmitting area of the light-transmitting region 101A), thereby completing the size adjustment of the variable aperture.

In the above method for adjusting the area of the effective light-transmitting region of the camera module, in this embodiment, step a is implemented to include the steps: a3, the light-impermeable fluid 30A is heated to release the gas 421A; and a4. the light-impermeable fluid 421A is pushed to flow.

Alternatively, step a includes the steps: a3A, the light-impermeable fluid 421A is cooled to dissolve the gas 421A; and a4A, the light-impermeable fluid 421A flow back as a negative pressure is formed.

It should be pointed out that the light-impermeable fluid 30A may be a carbonic acid solution in which carbon dioxide gas is dissolved (i.e., the gas 421A is carbon dioxide gas), which is easy to release the carbon dioxide gas when heated, and re-dissolve the carbon dioxide gas when cooled down. Of course, the light-impermeable fluid 30A may be a mixed liquid of carbonic acid solution mixed with carbon dioxide. Or the light-impermeable fluid 30A is an ammonium bicarbonate solution in which ammonia and carbon dioxide gas are dissolved (the gas 421A is a mixture of ammonia and carbon dioxide gas), which is heated to release the gas 421A and cooled down to re-dissolve the gas 421A. Those skilled in the art should understand that there are many combinations of the light-impermeable fluid 30A and the gas 421A that are not enumerated one by one here.

As shown in FIG. 29, preferably, the left side of the fluid accommodation cavity 40A is in communication with the passage opening 21A of the fluid passage 20A, wherein the driving unit 50A is attached and mounted to the right wall of the fluid accommodation cavity 40A of the main body 10A. Wherein the driving unit 50A heats the right side wall of the fluid accommodation cavity 40A, raising the temperature of the right side of the fluid accommodation cavity 40A. That is, the light-impermeable fluid 30A releases the gas 421A on the right side of the fluid accommodation cavity 40A, forming a gas cavity 42A, only making the light-impermeable fluid 30A flow to the left and enter the fluid passage 20A, wherein a fluid cavity 41A is formed on the left side of the fluid accommodation cavity. The higher the temperature is, the more the gas 31 is released, and the larger the volume of the gas cavity 42A is. Wherein the larger the volume of the light-impermeable fluid 30A flowing into the fluid passage 20A is, the smaller the volume of the fluid cavity 41A is. Conversely, when the temperature gradually decreases, the volume of the gas cavity 42A becomes smaller until disappearing, wherein the volume of the fluid cavity 41A is completely equal to the volume of the fluid accommodation cavity 40A. That is, the light-impermeable fluid 30A completely flows back to the fluid accommodation cavity 40A.

It can be understood that the driving unit 50A may also be mounted on the right edge of the top side of the base 11 corresponding to the gas cavity 42A of the fluid accommodation cavity 40A, so that the light-impermeable fluid 30A in the fluid accommodation cavity 40A keeps releasing the gas 421A on the right side to ensure the light-impermeable fluid 30A to enter the fluid passage 20A, while the gas 421A cannot enter the fluid passage 20A. Alternatively, the driving unit 50A can also be mounted on the right edge of the side of the cover 12A corresponding to the gas cavity 42A of the fluid accommodation cavity 40A to achieve the effect of changing the size of the variable aperture.

In the manufacturing process, the manufacturing method of the variable aperture device 100A has steps as follows:

X. The fluid groove 111A and the cavity groove 112A are formed by etching the bottom side of the base 11A, and the light-impermeable region is formed by painting or coating the periphery of the fluid groove 111A of the base 11A and the side of the base 11A. Wherein the top and bottom of the fluid groove 111A of the base 11A form the light-transmitting region 101A. It can be seen that the light-impermeable region 102A can also be firstly formed by painting or coating the periphery of the base 11A and the side of the base 11A (i.e. the light-transmitting region 101A is reserved in the middle of the base 11A), and then the light-transmitting region 101A in the middle of the base 11A is etched to form the fluid groove 111A, and the cavity groove 112A is formed by etching the light-impermeable region 102A of the base 11A, wherein the cavity groove 112A and the fluid groove 111A are communicated.

It can be understood that in the etching or molding step, multiple molding dies can be simultaneously used to form the fluid groove 111A and the cavity groove 112A of the base 11A on the same large transparent material body, which is then been cut and mass-produced into the base 11A. Similarly, another relatively large transparent material body can be cut into the same size as the base 11A to form the cover 12A, wherein at the right edge of the cover 12A corresponding to the gas cavity 42A of the base 11A, a mounting area is reserved for mounting the driving unit 50A, and then the cover 12A can be mass-produced.

Y. The driving unit 50A is attached to the mounting area of the cover 12A.

Z. The cover 12A is adhesively attached and sealed to the bottom side of the base 11A to seal the fluid groove 111A to form the fluid passage 20A and seal the cavity groove 112A to form the fluid accommodation cavity 40A. Wherein the driving unit 50A transfers heat to the right side of the fluid accommodation cavity 40A by heating, so that the gas 421A is released from the right side of the fluid accommodation cavity 40A to form the gas cavity 42A, and then the light-impermeable fluid 30A is controlled to flow left into the fluid passage 20A.

As shown in FIGS. 30 to 34, a variable aperture device 100B of a second modified embodiment of the present invention includes a main body 10B, a fluid passage 20B, an light-impermeable fluid 30B, a fluid accommodation cavity 40B, and a driving unit 50B, wherein the main body 10B is used to be provided in a camera module, so that the light entering or exiting the camera module needs to pass through or enter the main body 10B of the variable aperture device 100B, that is, the light is will not leak from the side of the main body 10B, preventing the camera module 200B from affecting the light collection. The fluid passage 20B is provided in the main body 10B, the fluid accommodation cavity 40B is in communication with the fluid passage 20B, and the driving unit 50B is capable to be controlled by the user to act on the fluid accommodation cavity 40B to drive the light-impermeable fluid 30B to flow back and forth in the fluid passage 20B and the fluid accommodation cavity 40B.

When the light-impermeable fluid 30B is driven to gradually flow into the fluid passage 20B, part of the light entering the light-impermeable fluid 30B cannot pass through the light-impermeable fluid 30B, that is, the part of the light cannot pass through the main body 10B, and the other parts of the light can still pass through the main body 10B, thereby reducing the light-transmitting region of the main body 10B, and reducing the amount of light entering (or the amount of light passing, the amount of light exiting, etc.). When the light-impermeable fluid 30B is driven to flow back to the fluid accommodation cavity 40B, the light-transmitting area of the main body 10B is increased, thereby increasing the amount of light entering, so that the variable aperture device 100B is capable to be controlled to change the amount of light entering.

Figure 30:
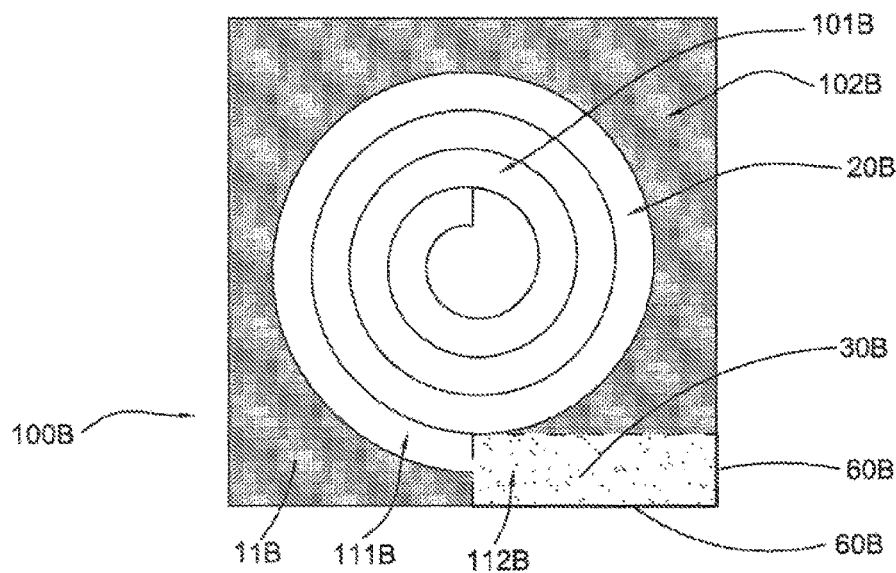
FIG. 30 is a schematic plan view of a main body of a variable aperture device according to a second modified embodiment of the present invention.
Figure 31:
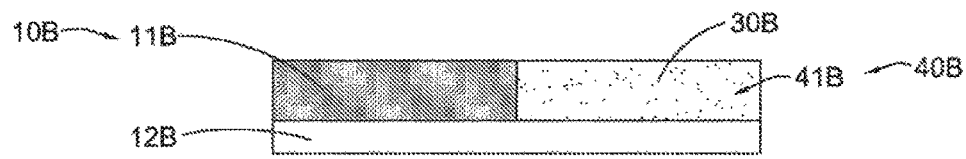
FIG. 31 is a schematic cross-sectional view of the main body of the variable aperture device according to the second modified embodiment of the present invention.
Figure 32:
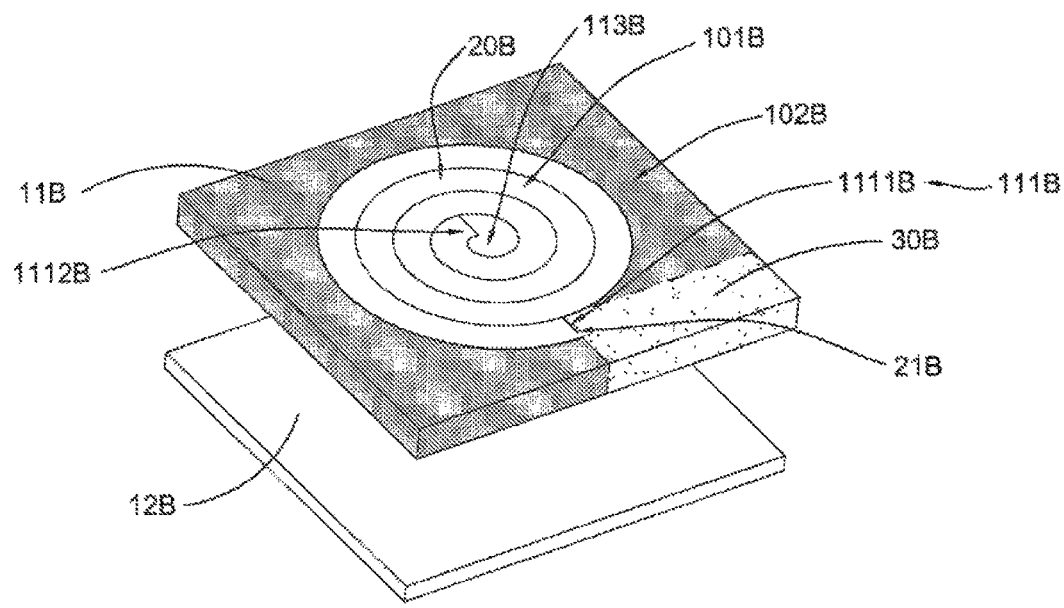
FIG. 32 is a perspective schematic view of the main body of the variable aperture device according to the second modified embodiment of the present invention.

As shown in FIGS. 30 and 32, in this embodiment, the main body 10B has a light-transmitting region 101B and a light-impermeable region 102B, wherein the light-transmitting region 101B is provided in the middle of the main body 10B, The light entering the camera module passes through the light-transmitting region 101B from the middle of the main body 10B, wherein the light-impermeable region 102B is provided on the periphery of the light-transmitting region 101B to prevent stray light from passing through the light-impermeable region 102B, eliminating stray light from other directions (light rays from the non-light-in region) from entering the light-transmitting region 101B, thereby ensuring the controllability of the amount of light entering the camera module.

Wherein, the fluid passage 20B is provided in the light-transmitting region 101B, when the light-impermeable fluid 30B is driven by the driving unit 50B from the fluid accommodation cavity 30B into the fluid passage 20B, an area of the light-transmitting region 101B that the light-impermeable fluid 30B occupies cannot transmit light, that is, the light-transmitting area of the light-transmitting region 101B is reduced. When the light-impermeable fluid 30B is driven to gradually enter the fluid passage 20B, that is, when a pipe length of the fluid passage 20B that the light-impermeable fluid 30B occupies gradually increases, the area of light-transmitting region 101B that occupied by the light-impermeable fluid 30B is gradually increased, making the light-transmitting area of the light-transmitting region 101B gradually reduce, so that the amount of light passing through the main body 10B is gradually reduced, and the user can controllably gradually reduce the amount of light entering the camera module 200B, realizing the gradual reduction of the amount of the light entering the variable aperture. Thus, the variable aperture device 100B can adjust the aperture size according to the needs of the photographer, so that the camera module 200B has an adjustable depth of field and more diverse shooting effects.

When the user operates the driving unit 50B to drive the light-impermeable fluid 30B from the fluid passage 20B to gradually flow into the fluid accommodation cavity 40B, the light-impermeable fluid 30B in the fluid passage 20B gradually decreases, that is, the pipe length of fluid passage 20B that the light-impermeable fluid 30B occupies gradually decreases, making the area occupied by the light-impermeable fluid 30B in the light-transmitting region 101B gradually decreases. So that the light-transmitting area of the light-transmitting region 101B gradually increases, thereby making the amount of light passing through the main body 10B gradually increases, and the user can controllably gradually increase the amount of light entering the camera module 200B, gradually increasing the amount of light entering the variable aperture.

As shown in FIG. 32, in this embodiment, the main body 10B includes a base 11B and a cover 12B, wherein the cover 12B is hermetically mounted on one of the sides (for example, the bottom side) of the base 11B. Wherein the bottom side of the base 11B has a fluid groove 111B (that is, the fluid groove 111B is a spiral channel or a spiral-like channel) and a cavity groove 112B, wherein the cavity groove 112B is provided in the fluid groove 111B. The groove opening 1111B is in communication with the fluid groove 111B. That is, the fluid groove 111B is sealed by the cover 12B to form the fluid passage 20B, and the cavity groove 112B is sealed by the cover 12B to form the fluid accommodation cavity 40B. That is, the fluid passage 20B is a spiral or a spiral-like fluid passage, wherein the passage opening 21B of the fluid passage 20B is in communication with the fluid accommodation cavity 40B. Wherein, before the cover 12B is sealed to the base 11B, the light-impermeable fluid 30B is injected into the fluid accommodation cavity 40B, and then the fluid passage 20B and the fluid accommodation cavity 40B are sealed to form the fluid passage 20B and the fluid accommodation cavity 40B, thereby sealing the impermeable fluid 30B in the fluid accommodation cavity 40B and the fluid passage 20B, and the impermeable fluid 30B can flow back and forth in the fluid accommodation cavity 40B and the fluid passage 20A without leakage. Wherein, the driving unit 50B is provided on the outer side of the base 11B, such as the top and bottom or the side, and acts on the light-impermeable fluid 30B in the fluid accommodation cavity 40B through the side wall, upper or lower wall of the base 11B to drive the light-impermeable fluid 30B to flow back and forth between the fluid accommodation cavity 40B and the fluid passage 20B to implement the variable aperture.

In the above-mentioned method for adjusting the effective light-transmitting area of the camera module, in this embodiment, step a is implemented as including the steps: a5, a separator is driven by a mechanical force to protrude and a6, the separator pushes the light-impermeable fluid to flow.

Or, step a includes the steps: a5A, a separator is driven to restore by a mechanical force; and a6A, a negative pressure forms to cause the light-impermeable fluid to flow back.

In this embodiment, the cover 12B is adhesively sealed on the bottom side of the base 11B, such as by using solid glue, glass glue, liquid glue, or light glue or other glues, or the cover 12B is integrally thermoplasticly sealed on the bottom side of the base 11B, or the cover 12B is in an integral structure of the base 11B.

The fluid groove 111B is formed on the bottom side of the transparent region 101B of the base 11B by etching, wherein the fluid groove 111B extends spirally from the center of the light-transmitting region 101B to the light-impermeable region 102B. That is, the outermost ring of the fluid groove 111B is integrally connected with the light-impermeable region 102B, and preferably, the fluid groove 111B can cover all the area of the light-transmitting region 101B. That is, the fluid groove 111B is formed on the bottom side of the base 11B by etching, and then the top and bottom sides of the periphery of the fluid groove 111B of the base 11B and the side walls of the base 11B are painted or plated to form the light-impermeable region 102B. That is, only the top and bottom sides of the fluid groove 111B of the base 11B are not painted or coated, so as to reserve the light-transmitting region 101B.

Correspondingly, a groove opening 1111B of the fluid groove 111B on the bottom side of the base 11B is etched integrally to form the cavity groove 112B, wherein the cavity groove 112B is etched between the sidewalls of the fluid groove 111B and the base 11B. When the cover 12B is sealed on the bottom side of the base 11B, the fluid accommodation cavity 40B is in communication with the passage opening 21B of the fluid passage 20B, so that the light-impermeable fluid 30B can flow back and forth spirally along the fluid passage 20B into the fluid accommodation cavity 40B.

It is understandable that the cavity groove 112B is located in the light-impermeable region 102B. In the etching process, the fluid groove 111B and the cavity groove 112B are formed by etching on the bottom side of the base 11B, and then by painting or coating to form the light-impermeable region 102B. Wherein the cavity groove 112B is located in the light-impermeable region 102B, the fluid groove 111B is located in the light-transmitting region 101B, and then the cover 12B is hermetically attached to the bottom side of the base 11B, so that the fluid groove 111B is sealed to form the fluid passage 20B and the cavity groove 112B is sealed to form the fluid accommodation cavity 40B, wherein the top and bottom sides of the fluid passage 20B of the base 11B are the light-transmitting region 101B, and the other area is the light-impermeable region 102B, that is, the fluid accommodation cavity 40B is located in the light-impermeable region 102B to prevent the controllable light-transmitting area of the light-transmitting region 101B from being affected. Correspondingly, when the fluid passage 20B is filled with the light-impermeable fluid 30B, the light-transmitting area of the light-transmitting region 101B reaches a minimum value, and when the light-impermeable fluid 30B completely flows out of the fluid passage 20B, and all entering the fluid accommodation cavity 40B, the light-transmitting area of the light-transmitting region 101B reaches the maximum value.

It is worth mentioning that a center surface 113B with a smaller area is reserved at the center of the base 11B, and the groove core 1112B of the fluid groove 111B is extended to the center surface 113B, so that the light-impermeable fluid 30B cannot continue to flow into the central surface 113B of the base 11B, ensuring that the light-transmitting region 101B cannot be completely blocked by the light-impermeable fluid 30B. That is, the minimum value of the light-transmitting area of the light-transmitting region 101B is equal to that of the central surface 113B which achieves a minimum light transmittance of the variable aperture device 100B. Moreover, when the area of the central surface 113B is close to or equal to zero, the light-transmitting area of the light transmission region 101B is zero, and the light transmission amount of the variable aperture device 100B is zero.

Figure 33:
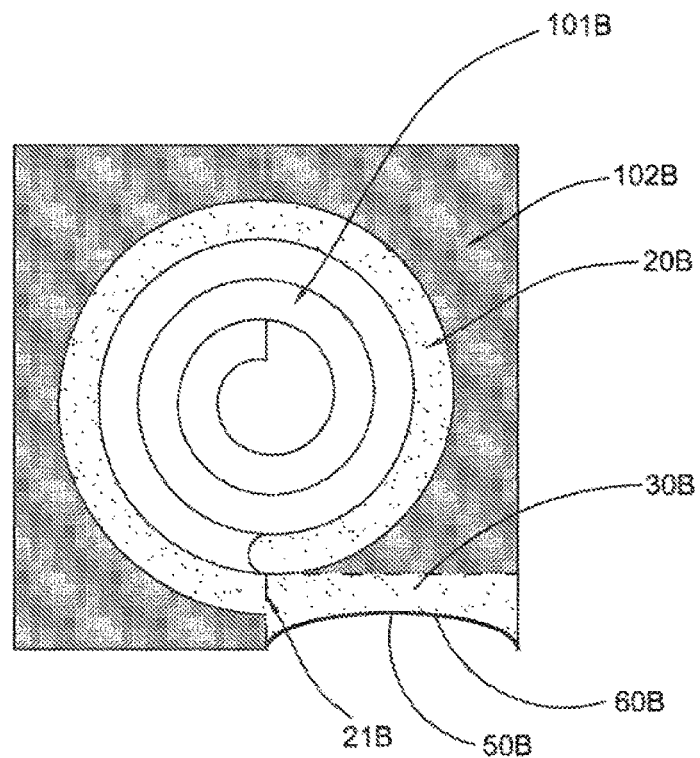
FIG. 33 is a schematic plan view of light-impermeable fluid being pushed into a fluid passage from a bottom side of the variable aperture device according to the second modified embodiment of the present invention.
Figure 34:
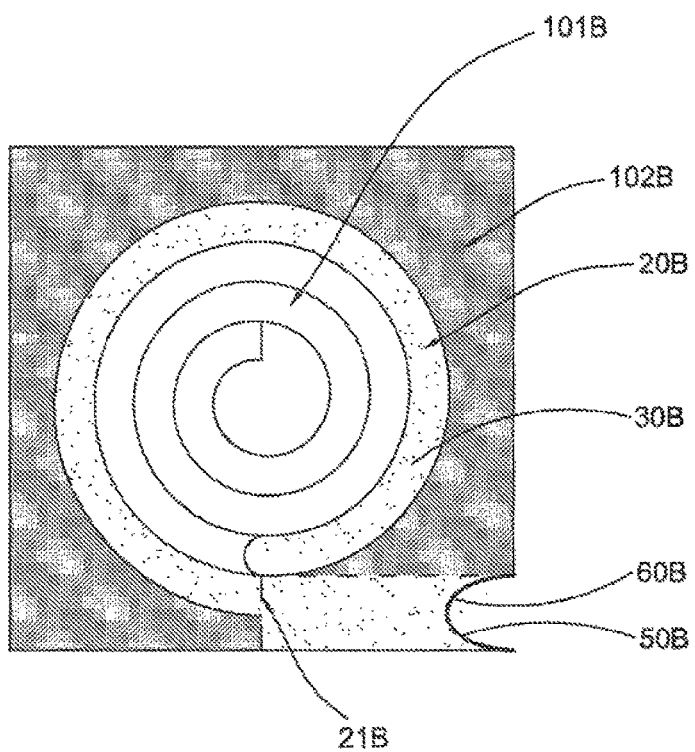
FIG. 34 is a schematic plan view of the light-impermeable fluid being pushed into the fluid passage from a side of the variable aperture device according to the second modified embodiment of the present invention.

As shown in FIGS. 33 and 34, in this embodiment, the variable aperture device 100B further includes a separator 60B, wherein the separator 60B is provided on the base 11B and is sealed the fluid accommodation cavity 40B together with the base 11B and the cover 12B. Preferably, the separator 60B is provided on the side wall of the base 11B and seals the fluid accommodation cavity 40B, wherein the driving unit 50B is configured to provide a force to act on the separator 60B. When the separator 60B is pushed into the fluid accommodation cavity 40B by the driving unit 50B, the light-impermeable fluid 30B is pushed into the fluid passage 20B. When the separator 60B returns to be parallel with the side wall of the base 11B relying on its own elastic restoring force or the pull-back force of the driving unit 50B, the light-impermeable fluid 30B flows from the fluid passage 20B to the fluid accommodation cavity 40B, and further implements the size adjustment of the variable aperture.

The manufacturing process includes the following steps:

A. The fluid groove 111B and the cavity groove 112B are formed on the base 11B by etching or molding, wherein an opening is made on the right side wall of the base 11B adjacent to the cavity groove 112B, and the opening is in communication with the cavity groove 112B, wherein the left side of the cavity groove 112B communicates with the groove opening 1111B of the fluid groove 111B;

B. The separator 60B is sealed and mounted on the opening of the base 11B for sealing the right side of the cavity groove 112B;

C. The cover 12B is hermetically mounted on the bottom side of the base 11B to form the fluid passage 20B and the fluid accommodation cavity 40B; and D. The driving unit 50B is mounted on the side wall of the main body 10B and act on the separator 60B.

The separator 60B is a flexible or elastic liquid-impermeable film. When subjected to external pressure, the separator 60B can transform, being able to be stretched and bent, and increased in surface area. When the external pressure disappears, the separator 60B can return to the previous state relying on its own restoring force, or the driving unit 50B can pull the separator 60B back to the original state. That is to say, when the separator 60B is subjected to the driving force of the driving unit 50B, the middle portion of the separator 60B will transform to produce a protrusion (that is, the surface area is increased), thereby making the impermeable fluid 30B in the fluid accommodation cavity 40B being pushed into the fluid passage 20B to reduce the light-transmitting area of the light-transmitting region 101B. When the driving force disappears, the separator 60 returns to the normal state relying on its own restoring force, or the driving unit 50B provides a pulling force pulling the separator 60 back to the normal state, so that a negative pressure is generated in the fluid accommodation cavity 40B which sucks back the light-impermeable fluid 30B in the fluid passage 20B, thereby expanding the light-transmitting area of the light-transmitting region 101B (i.e. resetting the light-transmitting area of the light-transmitting region 101B).

It can be understood that the separator 60B may also be a slightly hard separating board, or rubber material, etc., and the separator 60B is driven by the driving unit 50B to make a piston movement to implement the size adjustment of the variable aperture.

As shown in FIG. 33, in another embodiment, the separator 60B is provided on the lower side wall of the base 11B, wherein the left side of the fluid accommodation cavity 40B and the passage opening 21B of the fluid passage 20B are in communication with each other, wherein the driving unit 50B is provided on the bottom side of the base 11B to provide a force to push the separator 60B upward, that is, the separator 60B protrudes upward to push the light-impermeable fluid 30B in the fluid accommodation cavity 40B to implement the size adjustment of the variable aperture. Wherein, the width of the fluid accommodation cavity 40B is slightly larger than that of the passage opening 21B of the fluid passage 20B, so as to ensure that the separator 60B will not block the passage opening 21B of the fluid passage 20B when it is pushed to transform and protrude, ensuring that the light-impermeable fluid 30B can smoothly flow into the fluid passage 20B.

In this embodiment, the driving unit 50B may be a mechanical device that provides a mechanical force to directly act on the separator 60B, so that the separator 60B pushes the light-impermeable fluid 30B. Or the driving unit 50B is a blowing device, which generates wind or suction to indirectly act on the separator 60B to implement the work. Alternatively, the driving unit 50B is a device of other types such as an elastic device, etc., and no more examples are given here.

Figure 35:
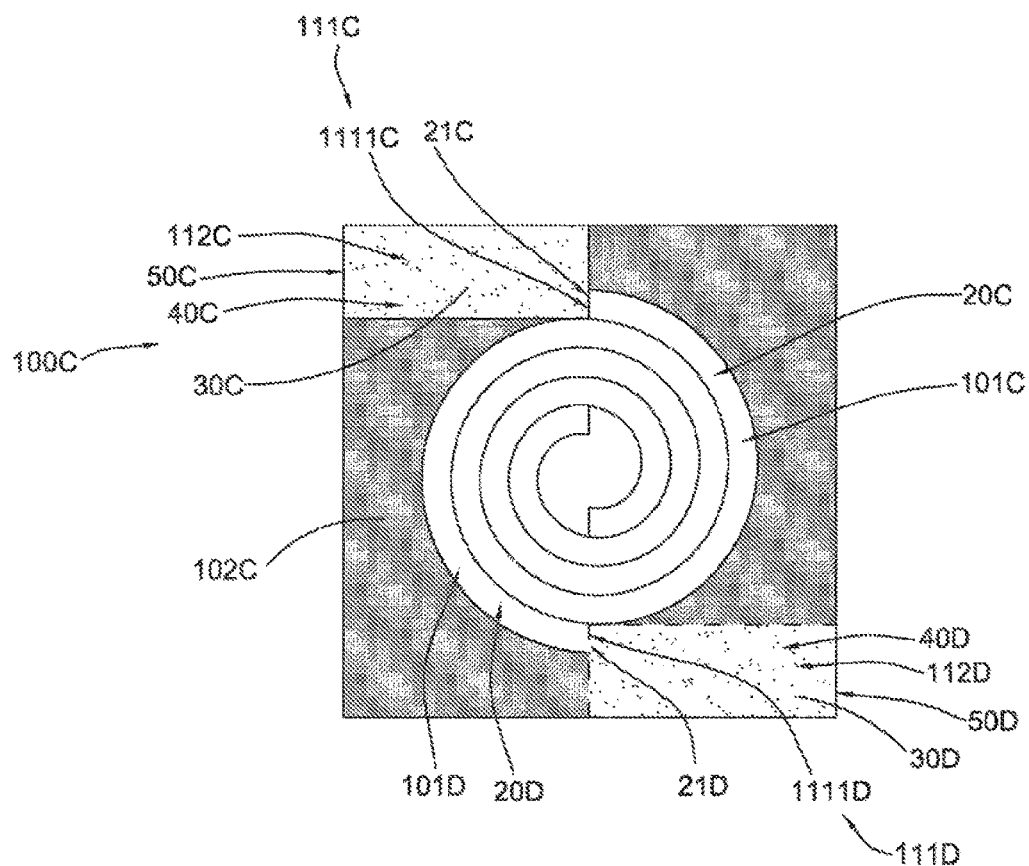
FIG. 35 is a schematic plan view of a main body of a double spiral channel of a variable aperture device according to a third modified embodiment of the present invention.
Figure 36:
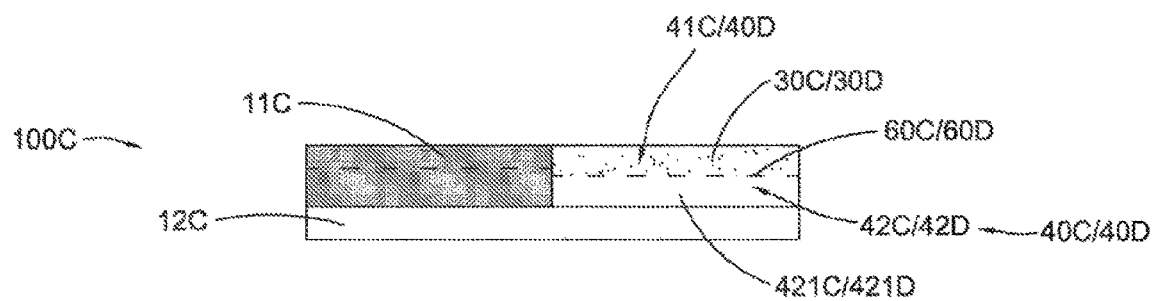
FIG. 36 is a schematic cross-sectional view of the main body of the double spiral channel of the variable aperture device according to the third modified embodiment of the present invention.

As shown in FIGS. 35 and 36, a variable aperture device 100C of a third modified embodiment of the present invention includes a main body 10C, two fluid passages 20C/20D, two light-impermeable fluids 30C/30D, two fluid accommodation cavities 40C/40D and two driving parts 50C/50D, wherein the main body 10C is used to be provided in a camera module, so that the light entering or exiting the camera module needs to pass through or enter the main body 10C of the variable aperture device 100C, that is, the light will not leak from the side of the main body 10C, which prevents the camera module 200C from affacting the collection of light. The fluid passages 20C/20D are respectively provided side by side on the main body 10C, wherein the fluid passage 20C and the fluid passage 20D are not in communication with each other, the fluid accommodation cavity 40C is in communication with the fluid passage 20C, and the driving unit 50C can be manipulated by the user to act on the fluid accommodation cavity 40C to drive the light-impermeable fluid 30C to flow back and forth between the fluid passage 20C and the fluid accommodation cavity 40C. Wherein, the fluid accommodation cavity 40D is in communication with the fluid passage 20D, wherein the driving unit 50D is capable to be controlled by the user to act on the fluid accommodation cavity 40D to drive the light-impermeable fluid 30D to flow back and forth in the fluid passage 20D and the fluid accommodation cavity 40D.

When the light-impermeable fluids 30C/30D are driven to gradually flow into the fluid passages 20C/20D, part of the light incident on the light-impermeable fluids 30C/30D cannot pass through the light-impermeable fluids 30C/30D (i.e. part of the light can not pass through the main body 10C), while the other parts of the light can still pass through the main body 10C, thereby reducing the light-transmitting area of the main body 10C, and reducing the amount of light entering (or the amount of light passing, the amount of light exiting, etc.). When the light-impermeable fluids 30C/30D are driven to flow back into the fluid accommodation cavities 40C/40D, the light-transmitting area of the main body 10C is increased, thereby increasing the amount of light entering, so that the variable aperture device 100C is capable to be controlled to change the amount of light entering.

In this embodiment, the main body 10C has a light-transmitting region 101C and a light-impermeable region 102C, wherein the light-transmitting region 101C is provided in the middle of the main body 10C, so that the light entering the camera module passes through the light-transmitting region 101C from the central of the main body 10C, wherein the light-impermeable region 102C is provided on the periphery of the light-transmitting region 101C to prevent stray light from passing through the light-impermeable region 102C, eliminating stray light (light rays in the non-light-in area) from other directions from entering the light-transmitting region 101C, thereby ensuring the controllability of the light entering of the camera module.

Wherein, the fluid passages 20C/20D are provided in the light-transmitting region 101C. When the light-impermeable fluids 30C/30D are driven by the driving units 50C/50D to flow into the fluid accommodation cavities 30C/30D respectively, light cannot pass through the area of the light-transmitting region 101C occupied by the light-impermeable fluids 30C/30D, that is, the light-transmitting area of the light-transmitting region 101C is reduced. When the light-impermeable fluids 30C/30D are driven to gradually enter the fluid passages 20C/20D, that is, when a pipe length of the fluid passages 20C/20D that the light-impermeable fluid 30C/30D occupies gradually increases, the area of the light-transmitting region 101C occupied by the light-impermeable fluids 30C/30D also gradually increases, so that the light-transmitting area of the light-transmitting region 101C gradually decreases, so that the amount of light passing through the main body 10C gradually decreases, and the user can gradually reduce the amount of light entering the camera module 200C in a controllable manner, and the amount of light entering the variable aperture is gradually reduced. Thus, the variable aperture device 100C can adjust the aperture size according to the needs of the photographer, so that the camera module 200C has an adjustable depth of field and more diverse shooting effects.

When the user operates the driving units 50C/50D to drive the light-impermeable fluid 30C/30D from the fluid passages 20C/20D into the fluid accommodation cavities 40C/40D, the light-impermeable fluids 30C/30D in the fluid passages 20C/20D gradually decrease, that is, the pipe length of the fluid passages 20C/20D occupied by the light-impermeable fluids 30C/30D gradually decrease, the area occupied by the light-impermeable fluids 30C/30D in the light-transmitting region 101C gradually decreases, so that the light-transmitting area of the light-transmitting region 101C gradually increases. Thus the amount of light passing through the main body 10C gradually increases, and the user can controllably gradually increase the amount of light entering the camera module 200C. The amount of light entering the variable aperture gradually increases.

As shown in FIG. 36, in this embodiment, the main body 10C includes a base 11C and a cover 12C, wherein the cover 12C is hermetically mounted on one of the sides of the base 11C (for example, the bottom side). Wherein the bottom side of the base 11C has two fluid grooves 111C/111D (that is, the fluid grooves 111C/111D are two double spiral grooves or double spiral grooves) and two cavity grooves 112C/112D, wherein the cavity grooves 112C/112D are provided at groove openings 1111C/1111D of the fluid grooves 111C/111D to communicate with the fluid grooves 111C/111D, respectively. That is, the fluid groove 111C is sealed by the cover 12C to form the fluid passage 20C, the cavity groove 112C is sealed by the cover 12C to form the fluid accommodation cavity 40C, and the fluid groove 111D is sealed by the cover 12D to form the fluid passage 20D, and the cavity groove 112D is sealed by the cover 12D to form the fluid accommodation cavity 40D. That is, the fluid passages 20C/20D is a double-spiral or double-spiral like fluid passage, wherein the passage opening 21C of the fluid passage 20C is in communication with the fluid accommodation cavity 40C, and the passage opening 21D of the fluid passage 20D is in communication with the fluid accommodation cavity 40D. Wherein, before the cover 12C is sealed to the base 11C, the light-impermeable fluids 30C/30D are injected into the fluid accommodation cavities 40C/40D respectively, and then they're sealed to form the fluid passages 20C/20D and the fluid accommodation cavities 40C/40D, so that the light-impermeable fluids 30C/30D are sealed in the fluid accommodation cavities 40C/40D and the fluid passages 20C/20D, and can flow back and forth in the fluid accommodation cavities 40C/40D and the fluid passages 20C/20D without leaking. Wherein, the driving units 50C/50D are provided on the outer side of the base 11C, such as the top and bottom or the side, and acts on the light-impermeable fluids 30C/30D in the fluid accommodation cavities 40C/40D respectively through the upper or lower wall of the base 11C to drive the light-impermeable fluids 30C/30D to flow back and forth between the fluid accommodation cavities 40C/40D and the fluid passages 20C/20D to implement the variable aperture.

In this embodiment, the cover 12C is adhesively sealed on the bottom side of the base 11C, such as using solid glue, glass glue, liquid glue, or light glue or other glues, or the cover 12C is integrally thermoplasticly sealed on the bottom side of the base 11C, or the cover 12C is in an integral structure of the cover 11C.

It can be understood that the passage openings 21C/21D of the fluid passages 20C/20D are respectively provided on the top and bottom sides of the main body 10C, that is, the fluid accommodation cavities 40C/40D are provided on the main body 10C respectively. On both sides of the light-transmitting region 101C, the driving units 50C/50D are respectively provided on both sides of the main body 10C to act on the light-impermeable fluids 30/30D in the fluid accommodation cavities 40C/40D, respectively. In other words, the light-impermeable fluids 30C/30D can enter the fluid passages 20C/20D from both sides of the light-transmitting region 101C at the same time or at different times to gradually reduce the light-transmitting region 101C from both sides. It can be seen that in this embodiment, the light-impermeable fluids 30C/30D enter or exit the fluid passages 20C/20D at the same time from both sides, so as to speed up or restore the speed for adjusting the light-transmitting area of the light-transmitting region 101C, thereby more quickly completing the adjustment of the size of the variable aperture. In addition, with respect to the preferred embodiment of the present invention, in this embodiment, the light-impermeable fluids 30C/30D enter or exit the fluid passages 20C/20D from both sides, making the light-transmitting area of the light-transmitting region 101C more tends to be similar to a circle, so that the shape of the light-transmitting region 101C always maintains a symmetrical shape, making the camera module 200 to obtain a more uniform amount of light, rather than a phenomenon of more on one side and less on the other side.

In this embodiment, the variable aperture device 100C further includes two separators 60C/60D, wherein the separators 60C is provided in the fluid accommodation cavity 40C, and the fluid accommodation cavity 40C is divided into a fluid cavity 41C and a gas cavity 42C, wherein the fluid cavity 41C is in communication with the fluid passage 20C, and the light-impermeable fluid 30C is stored in the fluid cavity 41C. The gas cavity 42C is in an airtight state and is used to store gas 421C (i.e., the gas cavity 42C neither communicates with the fluid cavity 41C nor communicates with the fluid passage 20C), wherein the separator 60C isolates the gas 421C in gas cavity 42C and the light-impermeable fluid 30C in the fluid cavity 41C from each other, that is, the separator 60C does not allow air and fluid to pass.

Wherein, the driving unit 50C is provided to transfer heat to the outer side wall of the gas cavity 42C of the base 11C, and the temperature of the wall of the gas cavity 42C of the fluid accommodation cavity 40C of the base 11C is increased, so that the gas 421C in the gas cavity 42C expand to generate a force to act on the separator 60C, which in turn causes the separator 60C to protrude toward the fluid cavity 41C, so that the volume of the fluid cavity 41C is reduced, and the fluid inside the fluid cavity 4C1 is squeezed into the fluid passage 20C, thereby reducing the light-transmitting area of the light-transmitting region 101C, and completing the reduction of the variable aperture. When the transfer of heat to the gas cavity 42C by the driving unit 50C is canceled, the temperature in the gas cavity 42C gradually decreases, so that the gas volume in the gas cavity 42C is reduced, thereby resetting the separator 60C, and the volume of the fluid cavity 41C is restored (increased to a normal volume), and then negative pressure is generated in the fluid cavity 41C, and the fluid in the fluid passage 20C is sucked back into the fluid cavity 41C, thereby restoring the light-transmitting area of the light-transmitting region 101C (increase to the normal light-transmitting area), and then the expansion (or restoration) of the variable aperture is implemented.

Correspondingly, the separator 60D is respectively provided in the fluid accommodation cavity 40D, and the fluid accommodation cavity 40D is divided into a fluid cavity 41D and a gas cavity 42D, wherein the fluid cavity 41D is in communication with the fluid passage 20D. Wherein the light-impermeable fluid 30D is contained in the fluid cavity 41D, and the gas cavity 42D seals and stores gas 421D. The driving unit 50D is configured to transfer heat to the outer side wall of the gas cavity 42D of the base 11D, and the wall of the gas cavity 42D of the fluid accommodation cavity 40D of the base 11D is increased in temperature, making the gas 421D in the gas cavity 42D expand to generate a force to act on the separator 60D, causing the separator 60D to protrude toward the fluid cavity 41D, so that the volume of the fluid cavity 41D is reduced, and the fluid in the fluid cavity 41D is squeezed to flow into the fluid passage 20D, thereby reducing the light-transmitting area of the light-transmitting region 101D, and implementing the reduction of the variable aperture.

It is understandable that the driving unit 50C and the driving unit 50D can be integrated in the same processor or controlled by the same controller, so that the driving unit 50C and the driving unit 50D can simultaneously generate driving forces to act on the light-impermeable fluids 30C and 30D in the fluid accommodation cavities 40C and 40D respectively, enabling the light-impermeable fluids 30C and 30D to flow at the same time with the same flow volume, thereby controlling the light-transmitting area of the light-transmitting region 101 to maintain symmetrical equality steadily.

As shown in FIGS. 38 to 44, a variable aperture device 100E of a fourth modified embodiment of the present invention includes a main body 10E, a fluid passage 20E, a light-impermeable fluid 30E, a fluid accommodation cavity 40E, and a driving unit 50E, wherein the main body 10E is used to be provided in a camera module main body of a camera module 200E, so that the light entering or exiting the camera module main body needs to pass through or enter the main body 10E of the variable aperture device 100E. The fluid passage 20E is provided in the main body 10E, the fluid accommodation cavity 40E is in communication with the fluid passage 20E, and the light-impermeable fluid 30E is stored and can flow back and forth between the fluid accommodation cavity 40E and the fluid passage 20E. Wherein the driving unit 50E is manipulated by the user to act on the fluid accommodation cavity 40E to drive the light-impermeable fluid 30E to flow back and forth between the fluid passage 20E and the fluid accommodation cavity 40E.

In particular, when not in operation, the light-impermeable fluid 30E is maintained partly stored in the fluid passage 20E and the remaining part is stored in the fluid accommodation cavity 40E, so as to keep the amount of light entering the variable aperture between the maximum value and the minimum value. And when the light-impermeable fluid 30E flows from the fluid passage 20E toward inside and outside (for example, flowing from the middle position to both sides), the amount of light entering is increase or decrease, so as to shorten the time for aperture changing at the time of working.

Figure 38:
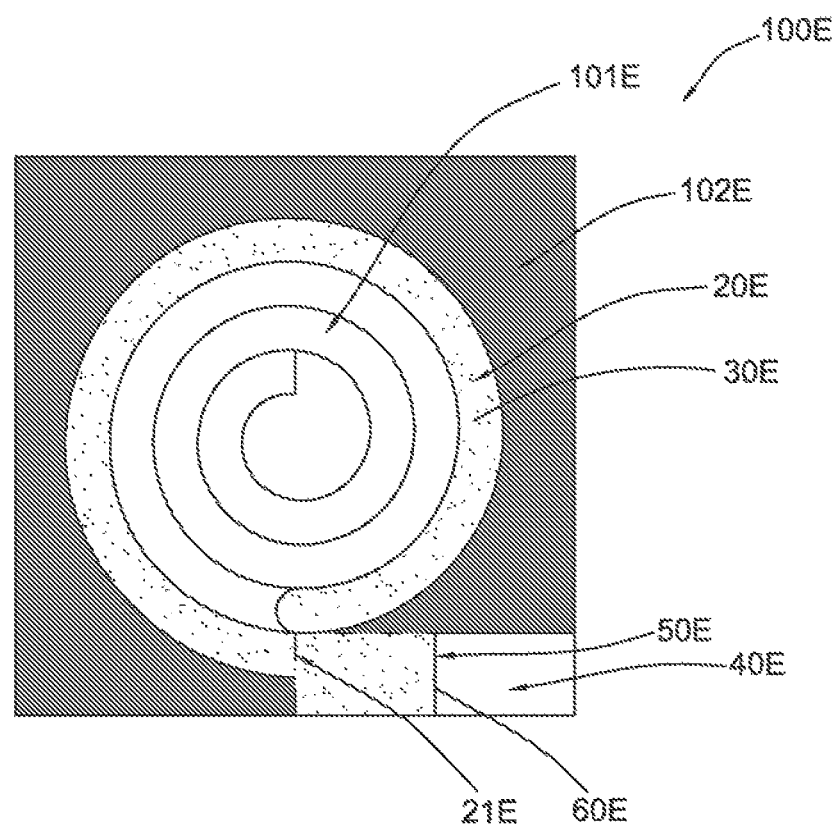
FIG. 38 is a schematic plan view of a variable aperture device according to a fourth modified embodiment of the present invention.

As shown in FIG. 38, in this embodiment, the main body 10E includes a light-transmitting region 101E and an light-impermeable region 102E, wherein the light-transmitting region 101E is provided in the middle of the main body 10E so that the light entering the camera module passes through the light-transmitting region 101E from the middle of the main body 10E, wherein the light-impermeable region 102E is provided at the periphery of the light-transmitting region 101E, and the fluid passage 20E is provided in the light-transmitting region 101E. When the light-impermeable fluid 30E flows back and forth in the fluid passage 20E, the light-transmitting area of the light-transmitting region 101E is correspondingly increased or decreased to control the amount of light entering.

In this embodiment, before adjusting the variable aperture (i.e. before operation), the light-impermeable fluid 30E is maintained and stored in the fluid accommodation cavity 40E and a part of the fluid passage 20E, preferably the light-impermeable fluid 30E extends from the fluid accommodation cavity 40E to a half position of the fluid passage 20E, and does not flow automatically, so as to keep a part of the light-impermeable region 101E blocked by the light-impermeable fluid 30E. In other words, before the aperture is adjusted, a part of the light-transmitting region 101E is originally shaded by the light-impermeable fluid 30E to be partially light-impermeable and not completely light-permeable, making the light-impermeable fluid 30E able to flow back and forth from the middle of the fluid passage 20E towards inside and outside to increase the rate of change in the amount of light entering the variable aperture.

Preferably, the light-impermeable fluid 30E is pre-stored in the fluid accommodation cavity 40E and extends to the near-central position of the fluid passage 20E, that is, under natural circumstances, the volume of the front half of the fluid passage 20E is occupied by the light-impermeable fluid, making the peripheral part (half the area) of the light-transmitting region 101E blocked and not capable to transmit light. Therefore, a maximum path length for the light-impermeable fluid 30E to flow into the passage to narrow the aperture equals to that of flowing out of the channel to increase the aperture, thus benefiting in shortening the time of aperture change.

When the amount of light entering the aperture is required to be reduced, while the user operating the driving unit 50E to cause the light-impermeable fluid 30E to flow inward from the middle of the fluid passage 20E, the light-impermeable fluid 30E in the fluid accommodation cavity 40E flows into the fluid passage 20E, so that more volume of the fluid passage 20E is occupied by the light-impermeable fluid 30E, thereby reducing the light-transmitting area of the light-transmitting region 101E, reducing the amount of light entering. And when the light-impermeable fluid 30E fills the fluid passage 20E or cannot continue to flow inward, the amount of light entering reaches the minimum value.

Correspondingly, when the amount of light entering the aperture is required to be increased, while the user operates the driving unit 50E to cause the light-impermeable fluid 30E to flow outward along the fluid passage 20E, the light-impermeable fluid 30E in the fluid passage 20E gradually flows into the fluid accommodation cavity 40E, thereby increasing the light-transmitting area of the light-impermeable region 101E, increasing the amount of light transmission, and when all the light-impermeable fluid 30E flows into the fluid accommodation cavity 20E or cannot continue to flow outwards, the amount of light entering reaches the maximum.

It is worth mentioning that after the end of each operation, the light-impermeable fluid 30E returns to the near-central position of the fluid passage 20E to maintain the above-mentioned natural state to facilitate the next operation, regardless of whether the aperture is enlarged or reduced, the flow path length of the light-impermeable fluid 30E can be approximately equal, which benefits in shortening the time of aperture change.

Of course, the length of the flow path of the light-impermeable fluid 30E along the fluid passage 20E on the two sides may not be equal, that is, the light-impermeable fluid 30E can be at any position of the fluid passage 20E while maintaining its natural state. Meanwhile, the path for the light-impermeable fluid 30E to flow to the maximum amount of light entering is longer or shorter than the path to the minimum amount of light entering, which facilitates customized setting and adjustment of the change rate of the maximum aperture and the minimum aperture, satisfying a wider range of requirements.

Figure 39:
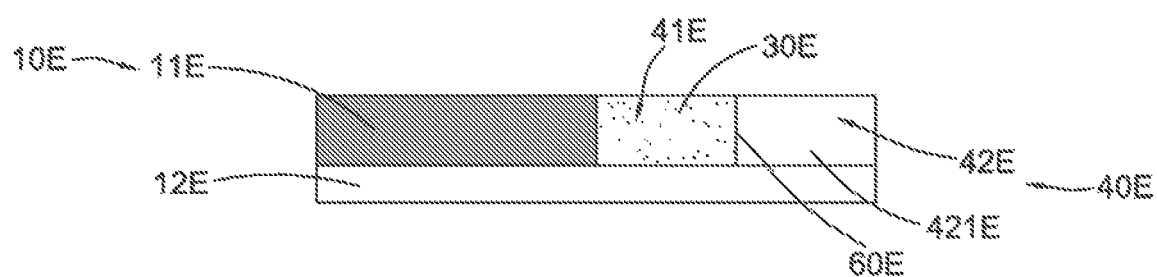
FIG. 39 is a schematic cross-sectional view of the variable aperture device according to the fourth modified embodiment of the present invention.
Figure 40:
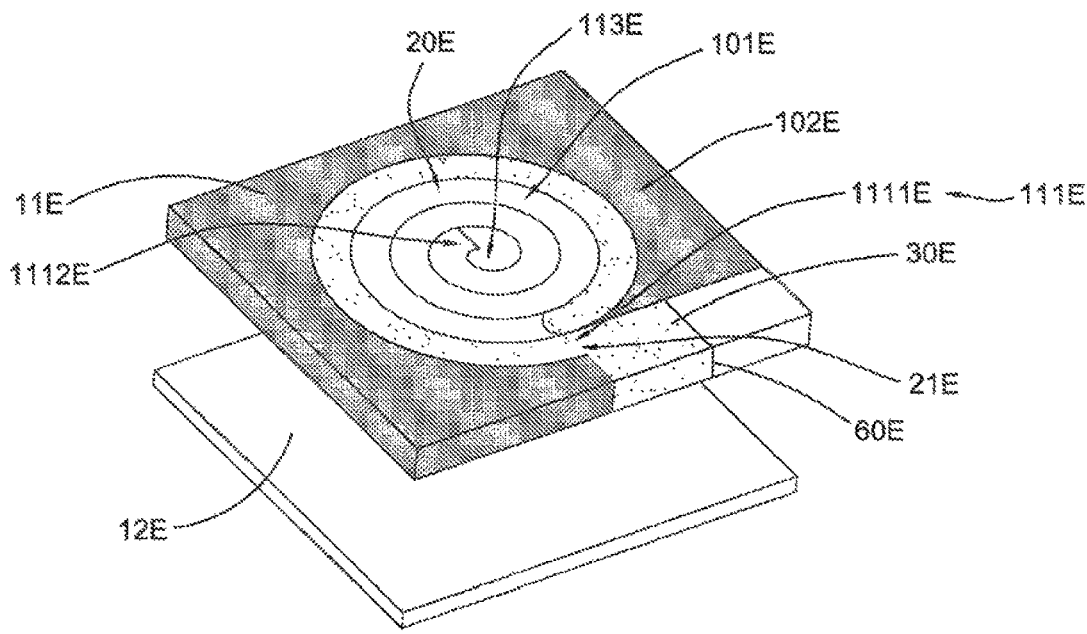
FIG. 40 is a perspective schematic view of a main body of the variable aperture device according to the fourth modified embodiment of the present invention.

As shown in FIGS. 39 and 40, in this embodiment, the main body 10E includes a base 11E and a cover 12E, wherein the cover 12E is hermetically mounted on one of the sides of the base 11E, and the bottom side of the base 11E includes a fluid groove 111E and a cavity groove 112E, wherein the cavity groove 112E is provided at a groove opening 1111E of the fluid groove 111E, which communicates with the fluid groove 111E, and at the center of the base 11E, a center surface 113E with a relatively small area is reserved. Those skilled in the art should understand that the structure of the main body 10E may be similar to the main body of the above-mentioned embodiment or slightly changed in structure, but the principle of its implementation is the same, and it will not be repeated here.

As shown in FIGS. 41 to 44, in this embodiment, the variable aperture device 100E further includes a separator 60E, wherein the separator 60E is provided in the fluid accommodation cavity 40E, which divides the fluid accommodation cavity 40E into a fluid cavity 41E and a gas cavity 42E. The fluid cavity 41E is in communication with the fluid passage 20E, and the light-impermeable fluid 30E is stored in the fluid cavity 41E. The gas cavity 42E is in an airtight state, and is used to store gas 421E (that is, the gas cavity 42E neither communicates with the fluid cavity 41E nor communicates with the fluid passage 20), wherein the separator 60E isolates the gas 421E in the gas cavity in 42E and the light-impermeable fluid 30E in the fluid cavity 41E from each other, that is, the separator 60E does not allow air and fluid to pass through.

The separator 60E is a flexible, air-tight film or diaphragm. When subjected to external pressure, the separator 60E can transform, and it can be stretched and bent, and the surface area increases, and when the external pressure disappears, the separator 60E can return to its natural state relying on its own flexibility. The periphery of the separator 60E is fixedly connected to the middle of the inner wall of the fluid accommodation cavity 40E of the base 11E, so that the volumes of the gas cavity 42E and the fluid cavity 41E are equal. And when the separator 60E is subjected to an external force, the periphery of the separator 60E will not fall off or move, and the middle of the separator 60E will transform and produce a protrusion (i.e., increasing the surface area), and the volume of the fluid cavity 41E and the gas cavity 42E will be relatively changed (i.e., when the volume of fluid cavity 41 increases, the volume of the gas cavity 42E decreases, and when the volume of the gas cavity 42E increases, the volume of the fluid cavity decreases). When the external force disappears, the separator 60E returns to the normal state, and the volume of the fluid cavity 41E and the gas cavity 42E return to an equal state.

It can be understood that the volume of the fluid accommodation cavity 40E may be slightly greater than or equal to the volume of the fluid passage 20E, wherein half of the light-impermeable fluid 30E is stored in the fluid cavity 41E, and the other half is stored and occupies half of the fluid passage 20E, so that the light-impermeable fluid 30E can fill the total fluid passage 20E or all flow out of the fluid passage 20E, maximizing the effective area of the light-transmitting region 101E. Of course, the volume of the fluid accommodation cavity 40E can also be smaller than the volume of the fluid passage 20E, wherein most of the light-impermeable fluid 30E is stored to occupy half of the fluid passage 20E, and the other small part is stored in the fluid cavity 41E. During operation, the light-impermeable fluid 30E can still flow from the middle position of the fluid passage 20E toward the inner and outer sides respectively.

Figure 41:
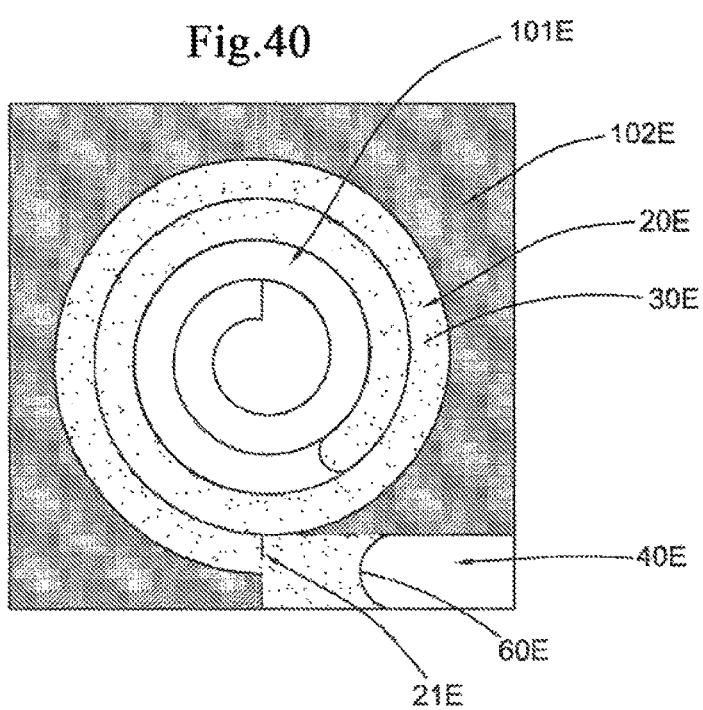
FIG. 41 is a schematic plan view of a reduced aperture of the variable aperture device according to the fourth modified embodiment of the present invention.
Figure 42:
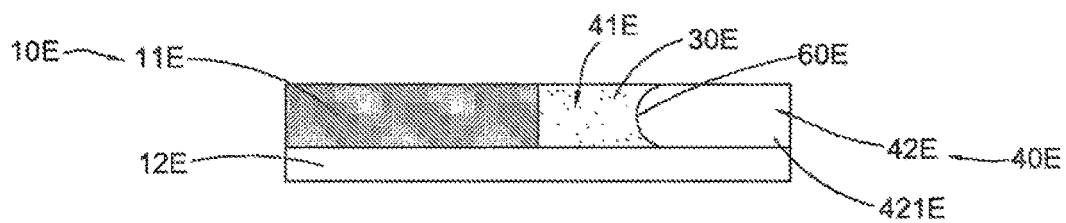
FIG. 42 is a schematic cross-sectional view of the reduced aperture of the variable aperture device according to the fourth modified embodiment of the present invention.

As shown in FIGS. 41 and 42, when the amount of light entering the aperture is increased, the driving unit 50E is configured to transfer heat to an outer side wall of the gas cavity 42E of the base 11E. By raising the temperature of the wall of the gas cavity 42E of the fluid accommodation cavity 40E on the base 11E, the gas 421E in the gas cavity 42E expands to generate a force to act on the separator 60E, so that the separator 60E protrudes toward the fluid cavity 41E, causing the volume of the fluid cavity 41E to reduce, and the fluid in the fluid cavity 41E to be squeezed into the fluid passage 20E. Thus the light-impermeable fluid 30E gradually decreases the light-transmitting area of the light-transmitting region 101E from the middle of the fluid passage 20E, implementing the reduction of the variable aperture. At the end of the operation, when the transfer of heat to the gas cavity 42E by the driving unit 50E is canceled, the temperature in the gas cavity 42E returns to the normal temperature state, so that the gas volume in the gas cavity 42E is reduced, and the separator 60E is reset and maintained in a natural state, where the volume of the fluid cavity 41E is restored to be equal to the volume of the gas cavity 42E, and then a negative pressure is generated in the fluid cavity 41E, and part of the fluid in the fluid passage 20E is sucked back into the fluid accommodation cavity 40E, until the flow reaches the middle position of the fluid passage 20E. Then the light-transmitting area of the light-transmitting region 101E is maintained at a medium size.

Figure 43:
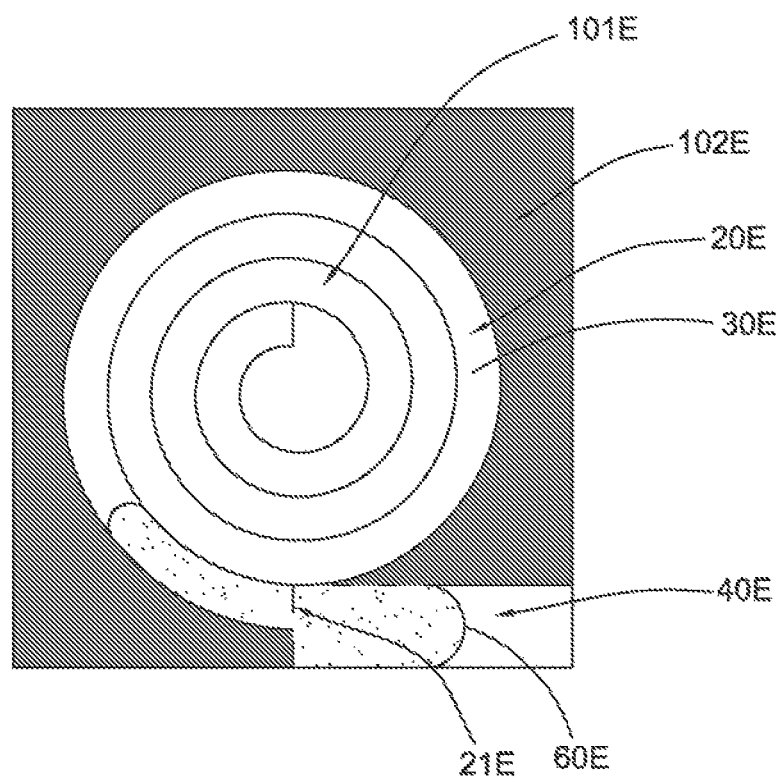
FIG. 43 is a schematic plan view of an enlarged aperture of the variable aperture device according to a fourth modified embodiment of the present invention.
Figure 44:
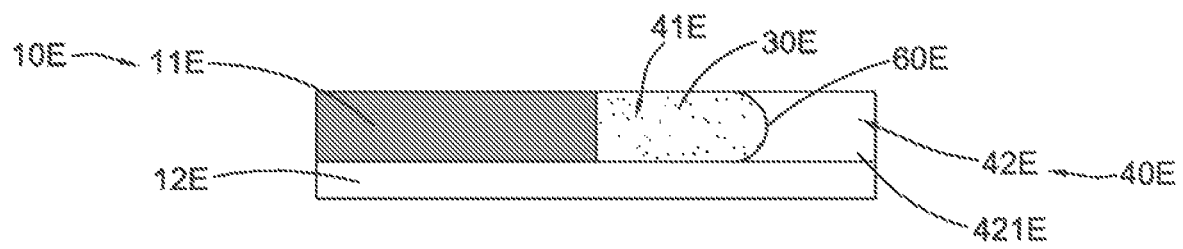
FIG. 44 is a schematic cross-sectional view of the enlarged aperture of the variable aperture device according to the fourth modified embodiment of the present invention.

As shown in FIGS. 43 and 44, when the amount of light entering the aperture is reduced, the driving unit 50E is provided to cool it down by absorbing heat or releasing cold air to the gas cavity 42E or by refrigeration. The lower down of the temperature in the gas cavity 42E makes the volume of the gas 421 in the gas cavity 42E to reduce, generating negative pressure which causes the separator 60E to protrude toward the gas cavity 42E, thereby increasing the volume of the fluid cavity 41E. The negative pressure acts on the light-impermeable fluid 30E in the fluid passage 20E, making the light-impermeable fluid 30E flow into the fluid cavity 41E, gradually expanding the light-transmitting area of the light-transmitting region 101E from a medium area, and implementing the expansion of the variable aperture. Similarly, at the end of the operation, the driving unit 50E stops cooling, and the temperature in the gas cavity 42E returns to normal temperature, resetting the separator 60E, and the light-impermeable fluid 30E flows back to the middle position of the fluid passage 20E, causing the light-transmitting area of the light-transmitting region 101E to be maintained at a medium size.

It can be seen that the driving unit 50E can also be implemented to apply the mechanical force on the separator 60E or be improved in other structures as in the above-mentioned embodiments to adjust the aperture of the present embodiment, which should also belong to the invention protection scope.

Those skilled in the art should understand that the above description and the embodiments of the present invention shown in the drawings are merely examples and do not limit the present invention. The purpose of the present invention has been completely and effectively achieved. The functions and structural principles of the present invention have been shown and explained in the embodiments. Without departing from the principles, the implementation of the present invention may have any variants or modifications.

The invention claimed is:

1. A manufacturing method of a variable aperture device comprising:
   i. etching one side of a base to form a fluid groove and a cavity groove, and painting or coating periphery of the fluid groove of the base and side of the base to form a light-impermeable region, wherein top and bottom sides of the fluid groove on the base form a light-transmitting region;
   ii. providing a separator to separate the cavity groove into a fluid cavity and a gas cavity, wherein the fluid cavity is communicated with the fluid groove, and the gas cavity is sealed to store gas, and the fluid cavities are filled with light-impermeable fluid;
   iii. attaching and sealing a cover on the side of the base to seal the fluid groove to form a fluid passage and to seal the cavity groove to form a fluid accommodation cavity; and
   iv. providing a driving unit on the periphery of the base for transferring heat to the gas cavity, expanding the air and making the separator protrude toward the fluid cavity.

2. The manufacturing method according to claim 1, wherein an outer peripheral side wall of the light-transmitting region of the main body is coated with a light-impermeable region or coated to form a light-impermeable region.

3. The manufacturing method according to claim 1, wherein the driving unit is configured to generate heat or absorb heat to directly or indirectly act on the light-impermeable fluid in the fluid accommodation cavity.

4. The manufacturing method according to claim 1, wherein the fluid groove is an arc-shaped groove or a V-shaped groove or a trapezoidal groove.

5. The manufacturing method according to claim 1, wherein the separator is implemented as a separating film or a separating board.

6. The manufacturing method according to claim 1, wherein the separator is horizontally or longitudinally provided in the fluid accommodation cavity.

7. The manufacturing method according to claim 1, wherein the fluid cavity is provided above or below the gas cavity.

8. The manufacturing method according to claim 1, wherein the driving unit is a temperature control device, and the driving unit is provided on a side of the main body corresponding to the fluid accommodation cavity, and the light-impermeable fluid at the side of the fluid accommodation cavity is heated to release gas or cooled to dissolve gas, making the light-impermeable fluid flow back and forth.

9. The manufacturing method according to claim 1, wherein the driving unit is attached to the side wall of the base or the top side of the base or the cover.

10. The manufacturing method according to claim 1, wherein the fluid passage is a single spiral channel or a double spiral channel.

11. The manufacturing method according to claim 1, wherein when not in operation, the light-impermeable fluid is totally maintained and stored in the fluid accommodation cavity, or totally stored in the fluid passage, or partially stored in the fluid passage and partially stored in the fluid accommodation cavity.

12. The manufacturing method according to claim 1, further includes the light-impermeable fluid, wherein the light-impermeable fluid is provided to flow back and forth between the fluid accommodation cavity and the fluid passage.

13. The manufacturing method according to claim 1, wherein step i is replaced with a step of filling a transparent material in a molten state in a molding die, wherein the molding die has a spiral pattern for forming a fluid groove and a protrusion for forming a cavity groove, and the fluid groove communicates with the cavity groove, and after cooling and solidifying the transparent material, a base and the fluid groove and the cavity groove on one side of the base are formed, then the periphery of the fluid groove of the base and the side of the base are painted or coated to form an light-impermeable region.

14. The manufacturing method according to claim 13, wherein an outer peripheral side wall of the light-transmitting region of the main body is coated with a light-impermeable region or coated to form a light-impermeable region.

15. The manufacturing method according to claim 13, wherein the driving unit is configured to generate heat or absorb heat to directly or indirectly act on the light-impermeable fluid in the fluid accommodation cavity.

16. The manufacturing method according to claim 13, wherein the fluid groove is an arc-shaped groove or a V-shaped groove or a trapezoidal groove.

17. The manufacturing method according to claim 13, wherein the separator is implemented as a separating film or a separating board.

18. The manufacturing method according to claim 13, wherein the separator is horizontally or longitudinally provided in the fluid accommodation cavity.

19. The manufacturing method according to claim 13, wherein the fluid cavity is provided above or below the gas cavity.

20. The manufacturing method according to claim 13, wherein the driving unit is a temperature control device, and the driving unit is provided on a side of the main body corresponding to the fluid accommodation cavity, and the light-impermeable fluid at the side of the fluid accommodation cavity is heated to release gas or cooled to dissolve gas, making the light-impermeable fluid flow back and forth.

* * * * *